US012587836B2

(12) United States Patent
Baker et al.

(10) Patent No.: US 12,587,836 B2
(45) Date of Patent: Mar. 24, 2026

(54) PRIVACY MODE FOR A WIRELESS AUDIO DEVICE

(71) Applicant: Lutron Technology Company LLC, Coopersburg, PA (US)

(72) Inventors: Rhodes B. Baker, Allentown, PA (US); Jeffrey Karc, Danielsville, PA (US); Galen E. Knode, Macungie, PA (US); Robert C. Newman, Jr., Emmaus, PA (US); John B. Nill, North Wales, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 199 days.

(21) Appl. No.: 17/978,261

(22) Filed: Nov. 1, 2022

(65) Prior Publication Data

US 2023/0046132 A1      Feb. 16, 2023

Related U.S. Application Data

(63) Continuation of application No. 16/221,400, filed on Dec. 14, 2018, now Pat. No. 11,490,248.

(Continued)

(51) Int. Cl.
*H04W 12/06* (2021.01)
*G06F 3/04817* (2022.01)
(Continued)

(52) U.S. Cl.
CPC ........ *H04W 12/02* (2013.01); *G06F 3/04817* (2013.01); *G06F 3/0482* (2013.01);
(Continued)

(58) Field of Classification Search
CPC .. H04W 12/02; G06F 3/04817; G06F 3/0482; G06F 3/0488; H04R 1/08; H04R 3/00; H04R 29/004
See application file for complete search history.

(56) References Cited

U.S. PATENT DOCUMENTS

| | | | |
|---|---|---|---|
| 4,408,308 A | 10/1983 | Smith et al. | |
| 8,229,130 B2 | 7/2012 | Paradisco et al. | |

(Continued)

FOREIGN PATENT DOCUMENTS

| | | |
|---|---|---|
| CN | 1505288 A | 6/2004 |
| CN | 101779442 A | 7/2010 |

(Continued)

OTHER PUBLICATIONS

IP.com search (Year: 2024).*

(Continued)

*Primary Examiner* — Moustapha Diaby
(74) *Attorney, Agent, or Firm* — Michael S. Czarnecki; Glen R. Farbanish; Philip N. Smith

(57) ABSTRACT

Devices that record data from a space, such as audio or video devices having microphones and/or cameras, may have a privacy mode which allows a user to temporarily prevent the device from recoding audio or video of the space. The privacy mode may be a privacy cover, button, airgap, or other mechanism to obfuscate the acoustic or video signal, or to remove power and/or communication from the camera, microphone, control circuit, or to the entire device itself. Additionally, the privacy mode may be remotely enabled for multiple devices in a space.

15 Claims, 14 Drawing Sheets

Related U.S. Application Data

(60) Provisional application No. 62/598,792, filed on Dec. 14, 2017.

(51) Int. Cl.

| | |
|---|---|
| *G06F 3/0482* | (2013.01) |
| *H04R 1/08* | (2006.01) |
| *H04W 12/02* | (2009.01) |
| *H04W 12/08* | (2021.01) |
| *H04W 12/12* | (2021.01) |
| *H04W 88/02* | (2009.01) |
| *G06F 3/0488* | (2022.01) |
| *H04R 3/00* | (2006.01) |
| *H04R 29/00* | (2006.01) |

(52) U.S. Cl.
CPC ............. *H04R 1/08* (2013.01); *G06F 3/0488* (2013.01); *H04R 3/00* (2013.01); *H04R 29/004* (2013.01)

(56) References Cited

U.S. PATENT DOCUMENTS

| | | | |
|---|---|---|---|
| 9,196,432 B1 | 11/2015 | O'Keeffe | |
| 2005/0065778 A1* | 3/2005 | Mastrianni | H04K 3/825 704/E21.014 |
| 2005/0284738 A1 | 12/2005 | Altonen et al. | |
| 2005/0284739 A1 | 12/2005 | Altonen et al. | |
| 2006/0109983 A1* | 5/2006 | Young | H04K 3/825 380/252 |
| 2006/0166659 A1* | 7/2006 | Wiese | G08B 25/08 455/418 |
| 2007/0192910 A1 | 8/2007 | Vu et al. | |
| 2009/0111352 A1 | 4/2009 | Hui | |
| 2009/0285418 A1 | 11/2009 | Klinghult | |
| 2010/0076600 A1 | 3/2010 | Cross et al. | |
| 2013/0340069 A1 | 12/2013 | Yoffe et al. | |
| 2014/0095153 A1* | 4/2014 | de la Guardia Gonzales | G10L 25/48 704/E21.001 |

| | | | |
|---|---|---|---|
| 2014/0372126 A1* | 12/2014 | Ady | G10L 25/48 704/270.1 |
| 2015/0189726 A1 | 7/2015 | Spira | |
| 2016/0134973 A1 | 5/2016 | Oliaei et al. | |
| 2016/0196832 A1* | 7/2016 | Maxon | G10K 11/1754 704/201 |
| 2016/0213308 A1 | 7/2016 | Proud | |
| 2016/0225343 A1* | 8/2016 | Ek | G06T 1/20 |
| 2016/0234356 A1 | 8/2016 | Thomas et al. | |
| 2016/0255450 A1 | 9/2016 | Matsumoto | |
| 2016/0275781 A1 | 9/2016 | Nold | |
| 2016/0327921 A1 | 11/2016 | Ribbich et al. | |
| 2017/0076721 A1 | 3/2017 | Bargetzi et al. | |
| 2017/0245076 A1 | 8/2017 | Kusano et al. | |
| 2017/0263254 A1 | 9/2017 | Dewan et al. | |
| 2017/0366662 A1* | 12/2017 | Schuster | H04M 1/72454 |
| 2018/0007469 A1* | 1/2018 | Kulavik | H04R 1/1041 |

FOREIGN PATENT DOCUMENTS

| | | |
|---|---|---|
| CN | 102624714 A | 8/2012 |
| CN | 105047191 A | 11/2015 |
| CN | 106463108 A | 2/2017 |
| CN | 106852193 A | 6/2017 |
| CN | 107422318 A | 12/2017 |
| EP | 2629194 A2 | 8/2013 |
| EP | 2635020 A1 | 9/2013 |

OTHER PUBLICATIONS

ProQuest search (Year: 2024).*
IP.com search (Year: 2025).*
ProQuest search (Year: 2025).*
IP.com search History (Year: 2025).*
Yi, Zhang, "Measurements and Control Circuits", Dec. 31, 2009, p. 96.
Leviton Manufacturing Co., Inc., "Leviton Releases New Solutions for Smart Device Privacy", Leviton. com, published Apr. 6, 2017, https://www.leviton.com/en/company/press-releases/leviton-releases-new-solutions-for-smart-device-privacy, accessed Dec. 13, 2018, 1pg.

* cited by examiner

PRIVACY MODE FOR A WIRELESS AUDIO DEVICE

CROSS-REFERENCE TO RELATED APPLICATIONS

This application is a continuation of U.S. patent application Ser. No. 16/221,400, filed Dec. 14, 2018, which claims priority to Provisional U.S. Patent Application No. 62/598,792, filed Dec. 14, 2017, the entire disclosure of which is incorporated by reference herein.

BACKGROUND

Voice integration devices, for example, voice assistants such as Amazon Echo or Google Home devices may allow a user to vocally interact with a connected microphone/speaker device. Voice integration devices may also be used to control other devices in a home or business setting through the use of a keyword. For example, a user can integrate a voice integration device (e.g., Amazon Echo) with a smart home network to control the lights through a keyword or wake word (e.g., "Alexa") followed by a user command (e.g., "turn on the living room light").

Voice integration devices may be connected via a network to a remote server which may perform voice recognition on the acoustic data of the user command in order to interpret the command, and may thereafter process the user command. The voice integration device may transmit acoustic data to the remote server upon receiving the keyword. The network connection between the remote server and the voice integration device may include an Internet router, and may be a wireless or wired connection. For example, the network connection may be a Wi-Fi or Ethernet connection to an Internet router. After the remote server has interpreted the acoustic data, the remote server may instruct a system controller device, such as a hub device, which may then transmit device commands to other devices based on the interpretation of the acoustic data. The voice integration device may respond verbally to the user to provide acknowledgement that the user command was received and/or respond with information requested by the user in the user command.

While voice integration devices may provide convenience to a user, a user may also desire the ability to put the device into a privacy mode, i.e., to disable the device. Voice integration devices may have a mute button for putting the device in a privacy mode, the button muting the speaker. When the mute button is activated, an LED indicator may turn on to indicate to the user that the device is muted. However, the voice integration device may continue "listening" to the audio traffic of the room while the mute button is activated, and the device may even store acoustic data locally. That is, the voice integration device may continue to monitor acoustic data in the space and record the data in a transmission buffer stored in memory of the device, even while the device is in a mute or privacy mode, but not transmit the acoustic data onto a network/to a cloud service for processing. Additionally, the device may be susceptible to malicious software updates from the Internet, for example, which may override the mute button and allow the device to continue transmitting acoustic data to the Internet when the device appears to the user to be in a mute or privacy mode (i.e., when the LED indicator appears in a mute mode). For example, the device may be actively listening while the LED indicator is on. To provide confidence that the device is in an inactive mode, a user may need to physically unplug or remove power from the device or disconnect the device from the network. This may be inconvenient and may also require the user to wait to use the device when the device goes through a startup sequence after power is applied. Another issue is that if a room has multiple voice integration devices, a user may need to activate the mute button on each device. Therefore, there is a need for a privacy mode for audio devices which gives a user full confidence that the device is no longer listening and that is not susceptible to malware attacks, as well as a mechanism for simultaneously placing multiple devices into privacy mode.

SUMMARY

Described herein is a privacy mode for a voice integration or audio device that is tamper-proof, i.e., not able to be compromised by malicious software. An audio device may be any device that has a microphone and can transmit acoustic data. The privacy mode may include mechanically muting or covering up the microphone of the audio device, providing a physical disconnect, or adding interference to obfuscate the audio signal. The physical disconnect may be an airgap or multiple airgaps which mechanically disconnect an electrical or opto-electronic connection, removing power and/or communication to the audio device or to the microphone of the audio device to fully disable the microphone(s) audio processing capabilities. The interference may be an acoustic interference or may be electrical noise added to the audio data of the audio device. According to another embodiment of the invention, the privacy mode may be a software enable or disable mechanism with a hardwired indicator, such as a light-emitting diode (LED) indicator, wherein the state of the LED indicator is tied to the state of the microphone and not separately controllable by a control circuit.

Additional embodiments as discussed herein include a remote-activated privacy mode, or "Privacy Mode" as a scene, which allows for multiple devices to enter privacy mode through the activation of a singular control point. This remote-activated privacy mode may be triggered automatically based on specific triggers, including, but not limited to: occupancy, user preference, or particular activity or voice commands of a user, as will be described in more detail herein.

One skilled in the art will also understand that the embodiments described herein are not mutually exclusive and may readily be combined with each other.

DETAILED DESCRIPTION

This application is directed towards a high-confidence tamper-proof privacy mode for audio devices. The privacy mode may be tamper-proof in that the privacy mode is not able to be compromised by malicious software, for example, by providing a visual indication tied to the hardware that may allow a user to confidently determine whether privacy mode has truly been enabled.

Figure 1:
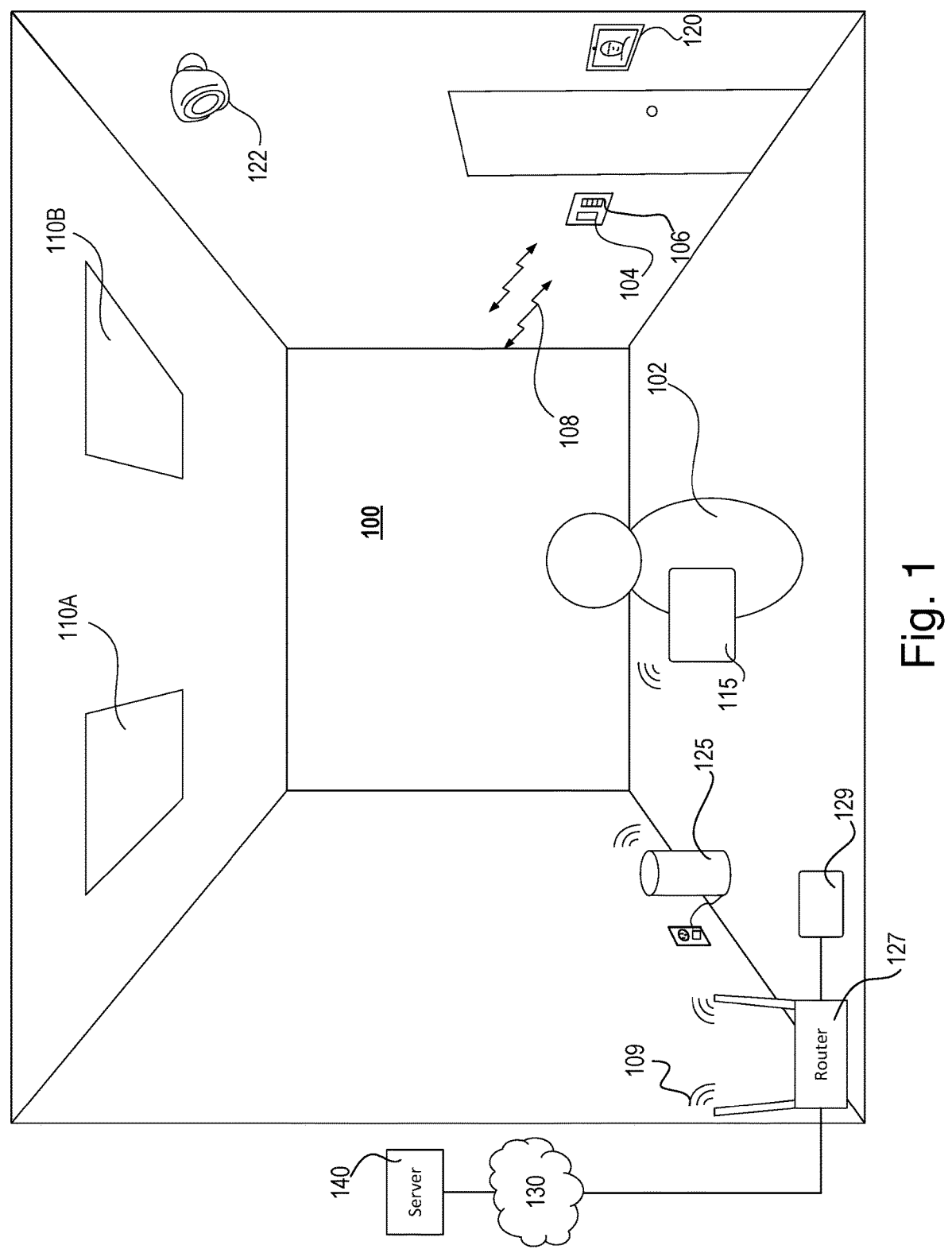
FIG. 1 is an example room with various wireless devices that may be responsive to a privacy mode setting.

FIG. 1 is an example user environment 100 containing various devices. The user environment 100 may include a load control device 104. For example, the load control device 104 may be a wall-mounted light switch or dimmer which is electrically connected to the lights 110A, 110B for controlling the lights 110A, 110B. Examples of wall-mounted dimmer switches are described in greater detail in U.S. Pat. No. 5,248,919, issued Sep. 29, 1993, entitled LIGHTING CONTROL DEVICE, and U.S. Pat. No. 9,679,696, issued Jun. 13, 2017, entitled WIRELESS LOAD CONTROL DEVICE, the entire disclosures of which are hereby incorporated by reference.

The user environment 100 may include a keypad 106. The keypad 106 may include one or more buttons for controlling lights, such as lights 110A, 110B, motorized window treatments, heating ventilation and air conditioning (HVAC) systems, etc. For example, the keypad 106 may have preset scenes associated with each of the one or more buttons, wherein actuation of the preset scene button may control the lights, window treatments, etc. to a predetermined level. Further, for example, the privacy mode may be enabled as part of a preset scene which may be selected by a user actuation of a button on the keypad 106.

The user environment 100 may include a security camera 122. The security camera 122 may be mounted to a ceiling or wall of the user environment 100, for example, and may record images of the user environment. Alternatively, the security camera 122 may be a standalone device, such as a webcam, which may be placed on a table and plugged into an electrical outlet or USB power connection, etc.

The user environment 100 may include a video intercom 120. The video intercom may record images and audio of the user environment and transmit the images and audio data to a remote device, such as another video intercom, a tablet, a PC, etc.

The user environment 100 may include a hub device 129 (e.g., a bridge) configured to enable communication with a network 130, e.g., a wireless or wired local area network (LAN). The hub device 129 may be connected to a router 127 via a wired digital communication link (e.g., an Ethernet communication link). The router may allow for communication with the network 130, e.g., for access to the Internet. Alternatively, the hub device 129 may be wirelessly connected to the network 130, e.g., using Wi-Fi technology. An example of the hub device 129 is described in greater detail in commonly-assigned U.S. Patent Application Publication No. 2014/0052783, published Feb. 20, 2014, entitled WIRELESS BRIDGE FOR FACILITATING COMMUNICATION BETWEEN DIFFERENT NETWORK, and U.S. Pat. No. 9,851,735, issued Dec. 26, 2017, entitled WIRELESS LOAD CONTROL SYSTEM, the entire disclosures of which are hereby incorporated by reference. Other examples are possible.

The hub device 129 may be configured to transmit RF signals 108 to the load control device 104 and/or the keypad 106 (e.g., using the proprietary protocol) for controlling the respective lighting loads 110A, 110B in response to digital messages received from external devices via the network 130. The hub 129 may be configured to receive RF signals 108 from the load control device 104 and/or the keypad 106, and to transmit digital messages via the network 130 for providing data (e.g., status information) to external devices. The hub device 129 may operate as a central controller for a load control system of the user environment 100, or may simply relay digital messages between the devices of the load control system and the network 130.

The user environment 100 may include a voice integration device, which may be described more broadly as an audio device. The audio device may have at least one microphone. The audio device may further have at least one speaker, either integrated with the audio device, or an external speaker to which the audio device transmits acoustic signals for playback in the space.

The audio device may be integrated into any of the devices shown in the user environment 100. For example, the audio device may be integrated with the load control device 104. Although the examples provided herein describe integrating the audio device with a load control device, one skilled in the art will understand that these embodiments are not limited to load control devices, but alternatively, or additionally, the audio device may be integrated with keypad 106, lighting loads 110A, 110B, security camera 122, and/or intercom 120, etc. Or, the audio device may be a standalone device, such as a wall-mounted audio device or a plug-in table top audio device, shown here as audio device 125.

The audio device may detect voice commands from a user 102 and may transmit acoustic data based on the voice commands to a remote server 140, such as a cloud based server, on the Internet 130 for acoustic processing. The audio device may transmit acoustic data to the remote server 140 on the Internet 130 via a wireless or wired connection to a router 127. For example, the connection may be through Wi-Fi or Ethernet. The router may receive the acoustic data from the audio device and transmit the acoustic data to the remote server 140 on the Internet 130.

The audio device may have a mute or privacy mode. The mute or privacy mode, when enabled by a user 102, may cause the device to stop transmitting acoustic data to the router 127. The audio device may provide a visual indication that the device is in a mute or privacy mode. For example, the audio device may have an LED indicator that turns on or changes color when the device is in the mute or privacy mode. Additionally, or alternatively, other indications may be used, for example, an indication on a mobile application may alert a user that the audio device is in the privacy mode.

The audio device may process the acoustic data and control other devices within the user environment 100 based on the processed acoustic data. For example, the audio device may enable a user to vocally control the lights 110A or 110B.

The user environment 100 may include additional devices which may receive audio and/or video inputs to monitor the space. Any or all of the devices may contain a microphone and/or a camera. Additionally, any or all of the devices may transmit data based on the received audio and video inputs monitored in the space. For example, the user environment may have a security camera 122, a video intercom 120, or microphones embedded in the load control device 104, or the keypad 106. The devices may transmit data to the router 127 for processing by a remote server on the Internet 130. The remote server may be the same server or a different server than the server 140 used to process the voice commands by the audio device 125. Although the devices are described herein as using a remote server 140 for voice processing, one skilled in the art will readily understand that voice processing may alternatively be achieved through processing local to the device.

The devices may transmit data directly to the router 127 via a wired or wireless connection. For example, the connection may be a Wi-Fi connection 109. Or, the connection may be a wired Ethernet connection. Alternatively, the devices may transmit data via a different wireless protocol 108 to an intermediary device, such as hub device 129, which translates the data and sends it to the router 127. For example, the devices may use a standard wireless protocol (e.g., ZigBee, Wi-Fi, Z-Wave, Bluetooth, Li-Fi, etc.), or a proprietary protocol (e.g., the ClearConnect protocol).

The user 102 may control any of the devices in the room through voice commands and/or wireless commands. For example, the user may press a button to send a wireless command to control one or more devices in the user environment. The button may be a physical actuator, such as a button on load control device 104 or keypad 106, or the button may be a software button on a graphical user interface (GUI) of a mobile application. For example, the user may press a software button on a GUI of a mobile application installed on a mobile device 115. The mobile device 115 may transmit a command to control one or more of the devices in the user environment in response to receiving the button press.

Each of the audio devices, for example devices 104, 106, and 125, may include a privacy mode. Although the privacy modes are described for audio devices, one will understand that the embodiments described herein are not limited to audio devices, and that privacy modes may also be realized for other types of devices which record sensitive data in the space. For example, the security camera 122 and/or the video intercom 120 may have privacy modes as described herein.

The privacy mode may prevent the device from transmitting data (such as audio or video data) from the user environment 100 to the router 127, the hub 129, or to any other device(s) within the room. For example, the privacy mode may prevent the device from transmitting data by disconnecting power and/or communication to a microphone or camera circuit thereby disabling output of the data.

As will be discussed in greater detail herein, the privacy mode for each device may be a device-level privacy mode and/or may be a remote privacy mode. A device-level privacy mode may require a user 102 to physically interact with a device to place the device into privacy mode. For example, a user may physically press a button on the device. In an alternative example, a user may engage or disengage a mechanism local to the device to put the device in a privacy mode. The device-level privacy mode may require a user to physically approach the device to engage or enable the privacy mode; that is, the device-level privacy mode may require a manual user input, as will be discussed in greater detail herein.

Alternatively, the user may remotely enable the privacy mode (i.e., remote privacy mode). A user may put the device or multiple devices into remote privacy mode when the user is not located proximate the device or devices, i.e., the user may enable privacy mode remotely without physically interacting with the device. For example, the user may enable privacy mode remotely through a mobile application on a mobile device, such as mobile device 115, or through a privacy button, such as a button on keypad 106. These and other embodiments will be discussed in greater detail herein.

As described, other devices such as the security camera 122 and/or the video intercom 120 may also have a privacy mode. When the security camera and/or video intercom is placed in the privacy mode, the security camera and/or video intercom may stop transmitting video feed updates to the hub device 129, router 127, or any other devices capable of using the video feed.

Figure 2:
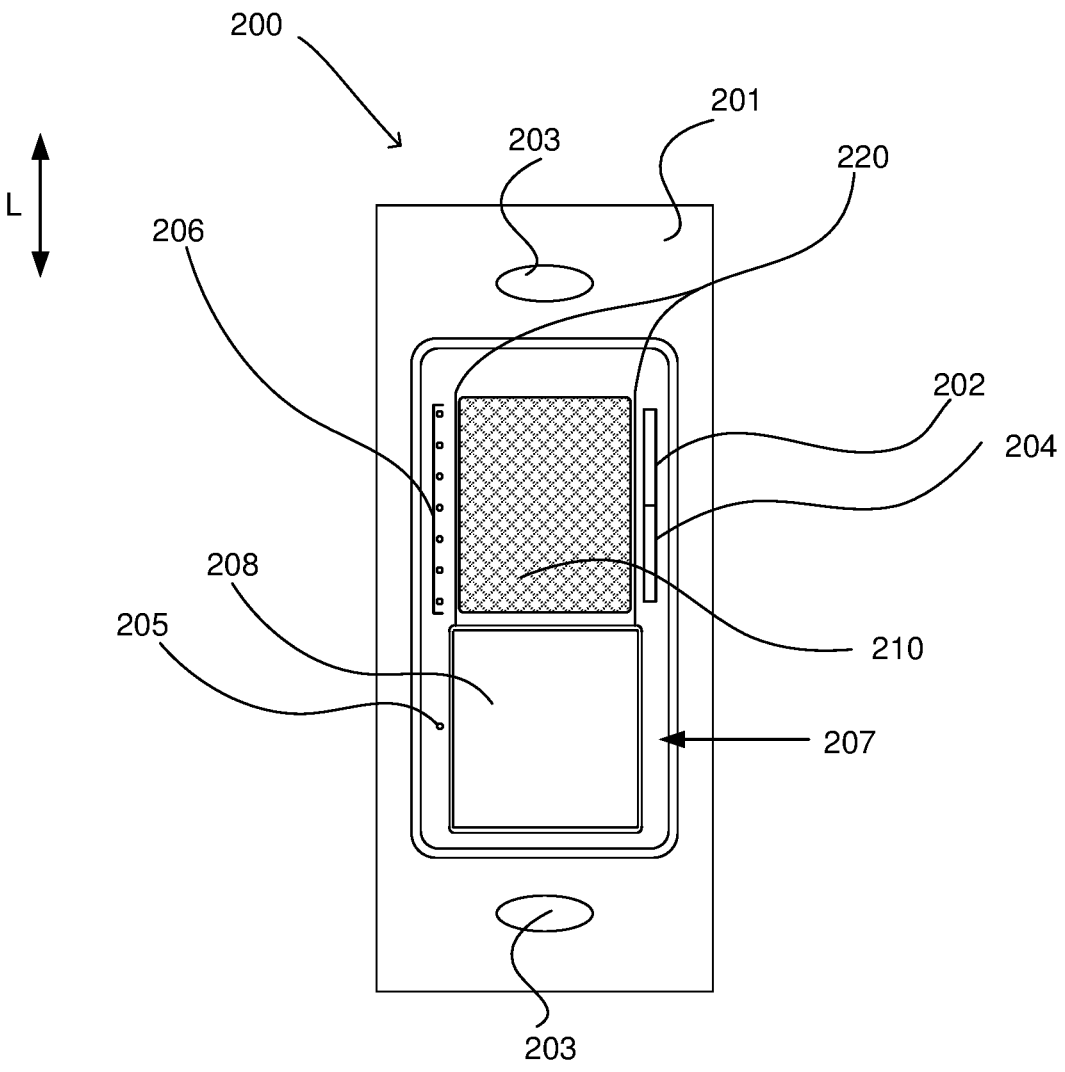
FIG. 2 is an example audio device with a privacy cover.

FIG. 2 is an example of an audio device 200 with a device-level privacy mode. The audio device 200 may be configured to be mounted in an electrical wallbox. For example, audio device 200 may include yoke 201 having one or more holes 203 therein, and a user interface/front surface 207. Screws, for example, may be inserted through holes 203 to secure audio device 200 to an electrical wallbox. Thereafter, a faceplate having an opening therein may be placed over audio device 200, covering yoke 201, and with user interface 207 extending through the opening in the faceplate. As one example, the faceplate may be a standard "off-the-shelf" faceplate such that the opening defines a standard opening. For example, the faceplate may be a decorator-style faceplate defining a standard-sized opening. Here, user interface 207 of audio device 200 may be dimensioned to fit within such an opening of the faceplate. One will recognize that other configurations are possible.

The audio device 200 may contain at least one microphone (not shown in FIG. 2) for monitoring acoustic data in the space in which it is installed. The audio device 200 may also include at least one speaker (not shown in FIG. 2).

The user interface 207 of device 200 may include a protective cover 210. The microphone and speaker may be located within device 200 and behind the protective cover 210. The protective cover 210 may serve to protect the microphone and/or speaker from damage, dust and debris. The protective cover 210 may be configured such that acoustic data originating in the space may be received by the microphone in a largely unaltered state. Similarly, the protective cover 210 may be configured such that acoustic data originating from the speaker may pass through the cover in a largely unaltered state. As an example, the protective cover 210 may be a grill, grate, mesh, perforated surface, cavity, or fabric although other types of covers may be used.

One will recognize that while the microphone and speaker may both be located behind the protective cover 210, according to another example, the microphone may be situated at another location on device 200. For example, audio device 200 may include one or more light emitting diodes (LEDs) (although other lighting elements may be used), such as indicator LED 205 and indicator LEDs 206. User interface 207 may include openings or cavities therein through which light emitted by respective LEDs 205 and 206 may be visible. The speaker may be located behind protective cover 210, while the microphone may be located behind a cavity or cavities of LED 205 and/or LEDs 206. Other examples are possible.

The audio device 200 may also have a volume adjuster that is accessible from user interface 207 for manually adjusting the output volume of the speaker of the device. As an example, the volume adjuster, as shown here, may be two volume buttons, a volume up button 202 and a volume down button 204. Alternatively, the volume adjuster may be a rotating knob, a capacitive or resistive touch area, or any other suitable volume adjustment. A user may press volume button 202 or 204 to increase or decrease the volume level, respectively. The volume adjuster may adjust the volume of the speaker by increasing or decreasing the amplitude of the speaker output.

As indicated, the audio device 200 may additionally include one or more LEDs, such as indicator LED 205 and indicator LEDs 206, which may include an array of seven LEDs according to this example. The indicator LEDs 206 may turn on to indicate the volume level of the speaker of the audio device 200. For example, the bottom four LEDs of the seven indicator LEDs 206 may turn on to indicate an approximate volume level of sixty percent of maximum volume. The LEDs may be in a linear array, as shown, or they may be arranged in a horizontal fashion. Although seven LEDs are shown here in indicator LEDs 206, any number of LEDs may be used, either located discretely in a linear array or as a band or line of LEDs (i.e., sharing a common lens). Alternatively, the LEDs 206 may be integrated into the volume adjuster 202 and/or 204. As another example, the LEDs 206 may be integrated into a rotating knob, or a capacitive or resistive touch area if such devices are used as the volume adjuster. One will recognize that other mechanisms may be used to indicated to a user the output volume of device 200.

Audio device 200 may include a mechanism to cover up, or muffle, the microphone. For example, the audio device 200 may contain a privacy cover 208. The privacy cover 208 may be a sliding cover. The privacy cover 208 may slide along direction L in one or more tracks 220 located along the vertical sides of protective cover 210 to either expose or cover the protective cover 210 and thus the microphone. For example, a user may physically slide the privacy cover 208 upward along direction L to cover the protective cover 210 (and microphone) and thereby engage the privacy mode, and may physically slide the privacy cover 208 downward along direction L to uncover the protective cover 210 (and microphone) to disengage the privacy mode. The privacy cover 208, when engaged, may reduce the sound pressure level (SPL) incident on the microphone such that speech in proximity to the device may not be discernable, i.e., to physically muffle the sound input received by the microphone. One will recognize that if the microphone is located behind a cavity of the LED 205 as previously mentioned, the privacy cover 208 may further cover the cavity of the LED 205 in order to mute or muffle the microphone.

The privacy cover 208 may be made of a material(s) to sufficiently muffle the microphone such that audio received (if any) by the microphone of device 200 and subsequently interpreted by a processor may not be interpretable into words or the source of the audio, etc. For example, the privacy cover 208 may be made of a rigid material such as metal or plastic, or the privacy cover 208 may be made of a soft material such as speaker fabric. The privacy cover 208 may have silicone, foam, and/or other suitable sound dampening material on the back surface thereof that faces protective cover 210 when the privacy cover 210 is engaged in privacy mode. Such materials may be used to create a more effective acoustic seal around the protective cover 210, and thus the microphone.

To enable or engage this privacy mode, a user may physically slide the privacy cover 208 upward over the protective cover 210, and thereby cover the microphone. Therefore, the privacy mode of device 200 may not be disabled remotely from the device, that is, the privacy mode may not be compromised through malicious software as the user has a means of manual override. One will understand that the amount of reduction in SPL incident on the microphone when the privacy cover 208 is seated over the protective cover 210/microphone is dependent upon the mechanical construction of the microphone housing, protective cover 210, and/or privacy cover. Therefore, different privacy covers may affect the amount of sound reduction. One will also recognize that different mechanical mechanisms besides sliding a privacy cover over the microphone may be used, provided that the microphone is covered or muffled. For example, the privacy cover may be snapped on, or the privacy cover may be rotated into place over the microphone.

Although the cover 208 is shown as sliding over the entire protective cover 210, the audio device may alternatively be designed such that the privacy cover only covers the microphone, and not the speakers. For example, the microphone and speaker may be located in different positions on the audio device as discussed above, and the protective cover may only slide over the microphone.

The indicator LED 205 of device 200 may be used to indicate when the privacy mode is enabled. For example, when the privacy mode is enabled or engaged by moving the privacy cover 208 over the protective cover 210/microphone, the LED 205 may turn on/illuminate to indicate that the privacy mode is on/active. Alternatively, the LED 205 may remain on during normal mode (i.e., not in privacy mode) but may turn off in when the audio device 200 is in privacy mode. Device 200 may be configured such that when the privacy cover 208 is not in privacy mode, the privacy cover may physically depress a lever, button, switch or other depression mechanism. The depression of the lever, button, switch etc. may cause LED 205 to not illuminate. Similarly, when the privacy cover is slid over the microphone thus enabling privacy mode the privacy cover may release the level, button, switch etc., which may cause the LED 205 to illuminate. One having ordinary skill in the art will recognize that device 200 may alternatively be configured to illuminate the LED 205 when the device 200 is not in privacy mode, and to not illuminate the LED 205 when the device 200 is in privacy mode. Further, one will recognize that other configurations and mechanisms may be used to control the illumination of LED 205 with respect to the movement of privacy cover 208 and the enabling/disabling of privacy mode/normal mode.

Figure 3:
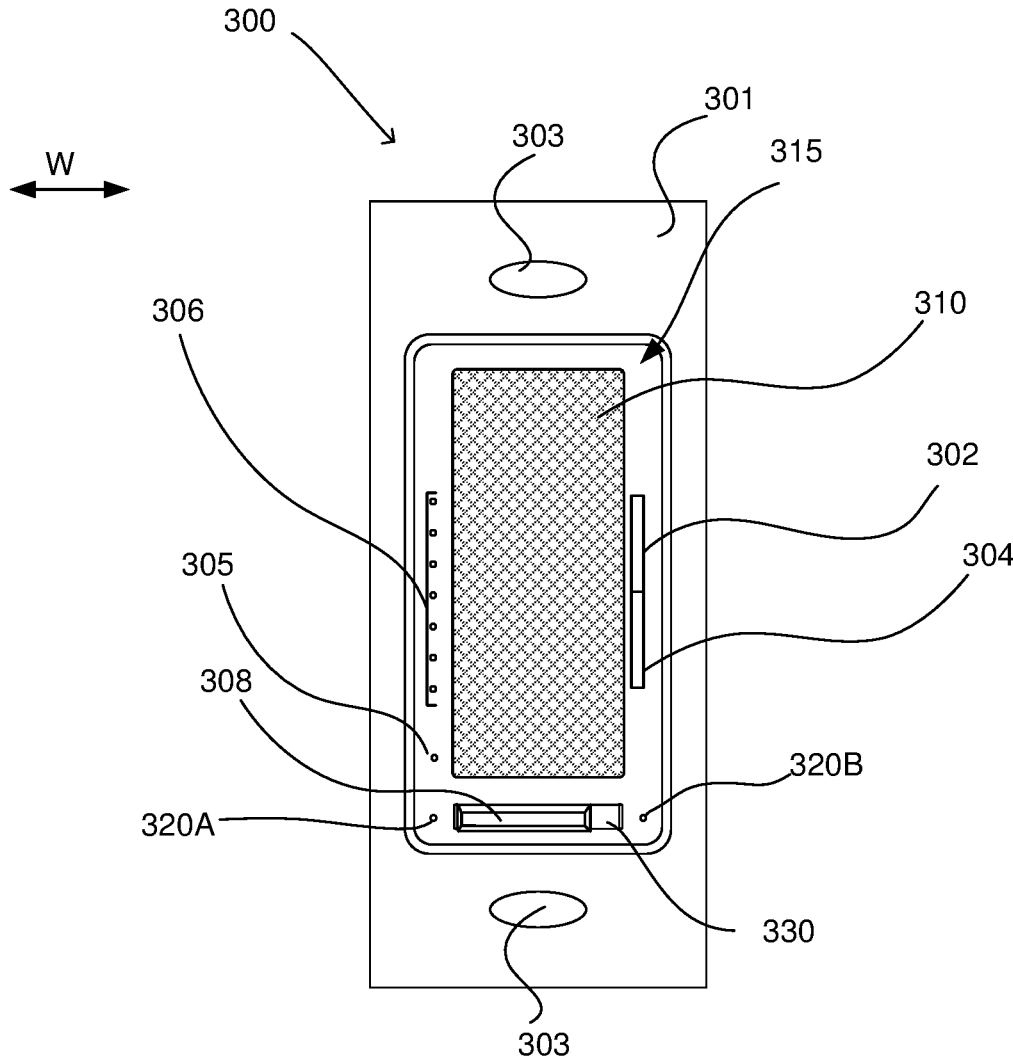
FIG. 3 is another example audio device with a privacy cover.

Other configurations of privacy cover 208 are possible. For example, FIG. 3 shows another example audio device 300. Audio device 300 may have similar elements as those shown on the audio device 200 of FIG. 2. For example, the indicator LEDs 306, privacy LED 305, yoke 301 with holes 303, and volume adjustment actuators 302, 304 may correspond to elements 206, 205, 201, 203, 202, and 204, respectively.

Audio device 300 may be similar to the audio device 200 as shown in FIG. 2 and use a privacy cover 308 to provide a device-level privacy mode similar to privacy cover 208. According to this example, the microphone(s) of the audio device 300 may be located in a different position(s) than the speaker(s) on the audio device. For example, the speaker may be located behind the protective cover 310. The audio device may have a user interface/front surface 315. In addition to including a protective cover 310, privacy LED 305, indicator LEDs 306, and volume buttons 302 and 304, the user interface may contain one or more holes or cavities such as holes/cavities 320A and 320B. Each cavity 320A, 320B may have one or microphones recessed behind the user interface 315. The microphones may be exposed to the environment by the cavities 320A, 320B; that is, the microphones may receive sounds/audio from the environment through the cavities 320A and 320B.

A user may slide the privacy cover 308 within a housing (i.e., behind the user interface 315) along direction W (left and right, for example), to place the audio device in and out of privacy mode. When the audio device is placed in privacy mode (such as by sliding the cover horizontally to the right along direction W), a portion of the privacy cover 308 that may be recessed inside the housing of the audio device may slide between the cavities 320A, 320B and the microphones behind the respective cavities. The cover 308 may effectively block the microphones from receiving audio that enters from the user interface/front surface 315 through the cavities 320A, 320B.

Similar to device 200 and privacy cover 208, device 300 and privacy cover 308 may be configured such that when the privacy cover 308 is moved to place the device 300 into the privacy mode, privacy LED 305 may become illuminated. When the cover is moved to normal mode (i.e., non-privacy mode), the privacy LED 305 may turn off, or not illuminate, or vice versa. One will understand that privacy LED 305 may be housed within cavity 320A and/or 320B to indicate a privacy mode.

According to an alternative or further example, a portion of the privacy cover 308, or the housing in which the cover slides, may have a different color than the rest of the cover 308. The color may indicate to a user that the audio device is in a privacy mode. For example, when the cover 308 is moved to the right along direction W to thus cover the microphone cavities 320A, 320B and mute the microphones, the portion of the cover which may be viewed by a user through the microphone cavities 320A, 320B may be red in color.

When the device 300 is not in privacy mode, that is, when the privacy cover 308 is moved to the left as shown in FIG. 3, the privacy cover 308 may have an exposed area 330. The exposed area may be the same color as the privacy cover. When the privacy cover is slid to the right along direction W to place the audio device in privacy mode, a similar area to the left of the privacy cover may be exposed. The exposed area to the left of the privacy cover may be red in color to indicate that the audio device is in a privacy mode. Additionally, or alternatively, the portion of the housing in which the privacy cover slides that is viewable by a user when the audio device is in privacy mode may be a different color than the rest of the cover 308. Although the color red has been used herein as an example, any color, pattern, or other visual indication of privacy mode may alternatively be used.

Figure 4:
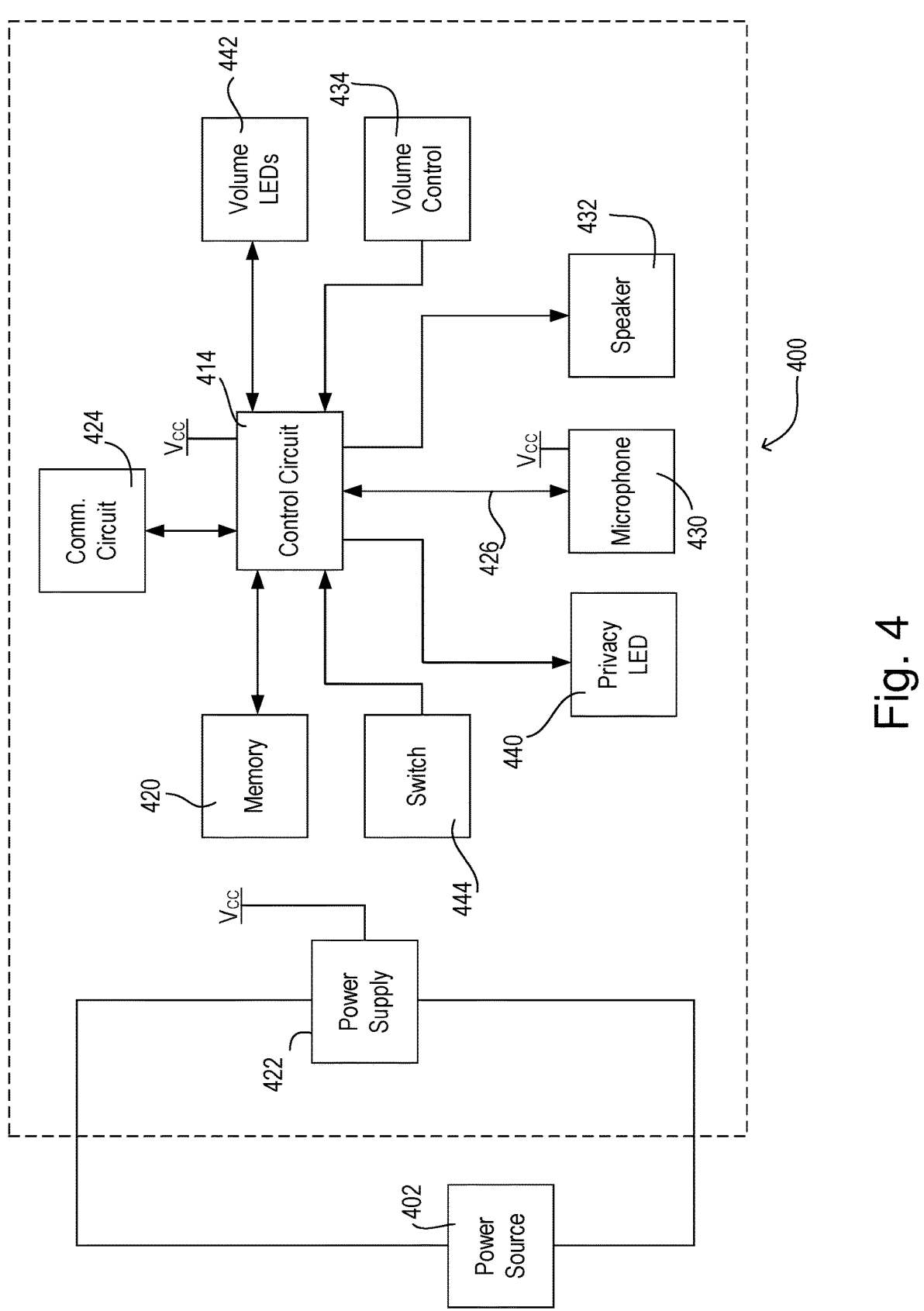
FIG. 4 is a block diagram of an example audio device according to FIGS. 2, 3.

Turning now to FIG. 4 there is shown an example block circuit diagram of an audio device 400, such as may represent any of audio devices 200 and 300 shown in FIGS. 2 and 3. The audio device 400 may be powered by a power source 402. The power source 402 may be any suitable alternating current (AC) or direct current (DC) power source. For example, the power source 402 may be an AC line voltage. Alternatively, the power source 402 may be a DC power source, such as a 12- or 48-volt supply provided by low voltage wires, Power over Ethernet (PoE), battery, solar cell, etc. The audio device may contain at least one power supply 422 which supplies a voltage $V_{CC}$ for powering the electronic circuitry of the audio device. The power supply 422 may be integrated with the audio device, or the power supply may be provided as an AC to DC power supply adapter which may be used to connect the audio device to a wall receptacle, such as power source 402.

The audio device 400 may have a control circuit 414. The control circuit may be powered by the voltage $V_{CC}$ provided by the power supply 422. The control circuit may include one or more of a processor(s) (e.g., a microprocessor(s)), a microcontroller(s), a programmable logic device(s) (PLD), a field programmable gate array(s) (FPGA), an application specific integrated circuit(s) (ASIC), or any suitable controller or processing device or combination thereof.

Audio device 400 may include one or more microphone(s) 430. Microphone 430 may include a power input lead for receiving a supply voltage $V_{CC}$ for powering the microphone. Microphone 430 may also include one or more data output leads 426. The data output leads 426 may communicate analog or digital audio data. For example, the microphone may use an inter-IC sound protocol (I2S), which may use a digital pulse code modulation (PCM) to communicate the microphone data and may include one or more clock lines. In another example, the data output lead may use a digital pulse density modulation (PDM). Other data lines and protocols are contemplated.

The control circuit 414 may be adapted to receive audio signals from the microphone 430. That is, the control circuit 414 may be in electrical communication with the microphone 430 via the data output leads 426. The microphone may be a standalone microphone with external circuitry, or the microphone may be a single package such as a chip or daughterboard that includes an integrated amplifier. For example, the microphone may be a MEMS (Micro-Electro-Mechanical System) microphone. One example suitable microphone may be a MP45DT02-M MEMS audio sensor omnidirectional digital microphone, manufactured by STMicroelectronics. Alternatively, the microphone may be an electret microphone, condenser microphone, or any other broadband acoustic input device available in a suitably small package size.

The microphone 430 may comprise multiple input microphones. For example, the microphone 430 may be a group of microphones physically spaced apart from one another, for example, a microphone array. Multiple input microphones may allow for improved ambient noise rejection and acoustic beam-forming or beam-steering, whereby the audio device may be directionally sensitive to input sounds.

The audio device 400 may contain one or more communication circuits 424 which are operably connected to the control circuit 414. The communication circuit 424 may be a wireless communication circuit and may send or receive wireless commands and/or data to an external device or network. Alternatively, the communication circuit 424 may be a wired communication circuit, for example, connected to a USB-C, Ethernet or CAT5, Serial cable, or any other type of communication wiring. For example, the communication circuit 424 may send acoustic data to a remote network for acoustic processing. The remote network may be located on a cloud server hosted on the Internet. The audio device may communicate to the remote network via one or more intermediary devices, such as a hub device and/or a router device. The communication protocol may include one or more of the following: Wi-Fi, ZigBee, Bluetooth, or other similar protocols with sufficient bandwidth to transmit audio data.

The audio device 400 may have one or more memory modules ("memory") 420 (including volatile and/or non-volatile memory modules) that may be non-removable memory modules and/or removable memory modules. Memory 420 may be communicatively coupled to the control circuit 414. Non-removable memory 420 may include random-access memory (RAM), read-only memory (ROM), a hard disk, or any other type of non-removable memory storage. Removable memory 420 may include a subscriber identity module (SIM) card, a memory stick, a memory card, or any other type of removable memory. The memory 420 may store one or more software based control applications that include instructions that are executed by the control circuit 414. The control circuit, when executing such instructions, may provide the functionality described herein. The memory may also store data including operating parameters. As a further example, the control circuit may store acoustic data received by the control circuit from the microphone 430 in the memory 420. For example, the memory 420 may act as a buffer for temporarily storing acoustic data to be transmitted to a remote server 140 for acoustic processing via the communication circuit 424. Other examples are possible.

The audio device may also include one or more speakers 432 coupled to the control circuit 414. The speaker(s) 432 may provide audible communication and/or feedback to a user. For example, the speaker(s) 432 may allow the audio device 400 to communicate audibly with a user, or the speaker(s) may be used to play music, etc. The control circuit 414 may send acoustic data to the speaker(s) 432 to generate audio signals. For example, the control circuit 414 may receive acoustic data from the communication circuit 424 and may send the acoustic data to the speaker(s) 432. The speaker(s) 432 may then play/communicate the acoustic data to a user. For example, the acoustic data received from a cloud server may be a response to a question asked by the user, and the control circuit 414 may be configured to cause the speaker(s) 432 to acoustically broadcast the response/answer for the user. The audio device may further include a volume control 434 coupled to the control circuit 414 and for controlling the output volume of speaker 432.

Additionally, the audio device may include one or more indicator LEDs, shown here as volume LEDs 442, for example, that may be similar to indicator LEDs 206 shown in FIGS. 2 and 3. For example, the volume LEDs 442 may be an array of LEDs. The volume LEDs 442 may be used to indicate a volume level of the speaker(s) 432. For example, each LED in the full array of LEDs 206 may light up to display a maximum volume level, while only half (or approximately half) of the LED array may light up to show a volume level of 50 percent of maximum volume.

The audio device may further include one or more indicator LEDs, shown here as privacy LED 440, that may be used to indicate when the audio device is in privacy mode. For example, when a user places the audio device 400 into a privacy mode, the privacy LED 440 may turn on. Alternatively, the privacy LED 440 may be on during normal operation and may turn off when a user places the audio device 400 into the privacy mode. In this way, the LED 440 may be a privacy indicator LED.

The audio device 400 may further include a switch 444. The switch 444 may be actuated when the privacy mode is enabled. A described previously, the switch may be depressed by a lever, button, etc. For example, when the privacy cover is over the microphone 430 (i.e., the audio device 400 is in privacy mode), the switch 444 may be in a closed or "on" position. The closing of the switch 444 may turn on the privacy LED 440 to indicate to a user that the audio device 400 is in privacy mode. For example, the switch 444 may be connected to the control circuit 414. When the control circuit 414 detects that the switch 444 has been actuated, the control circuit may turn on the privacy LED 440.

In a second example, different from what is shown in FIG. 4, the switch 444 may be connected in series electrical connection between the supply voltage $V_{CC}$ and the privacy LED 442. When the privacy cover is slid over the microphone, the switch 444 may be depressed into the "on" position, thereby providing power to the privacy LED 442 to turn on the LED. In this way, the switch 444 may control the illumination of the privacy LED 440.

The audio device 400 may include additional circuitry not shown here, including, but not limited to: actuators, load control circuitry, passive infrared occupancy sensing, microwave occupancy sensing, ambient light sensing, timeclock or time-of-day tracking, and the like.

Figure 5:
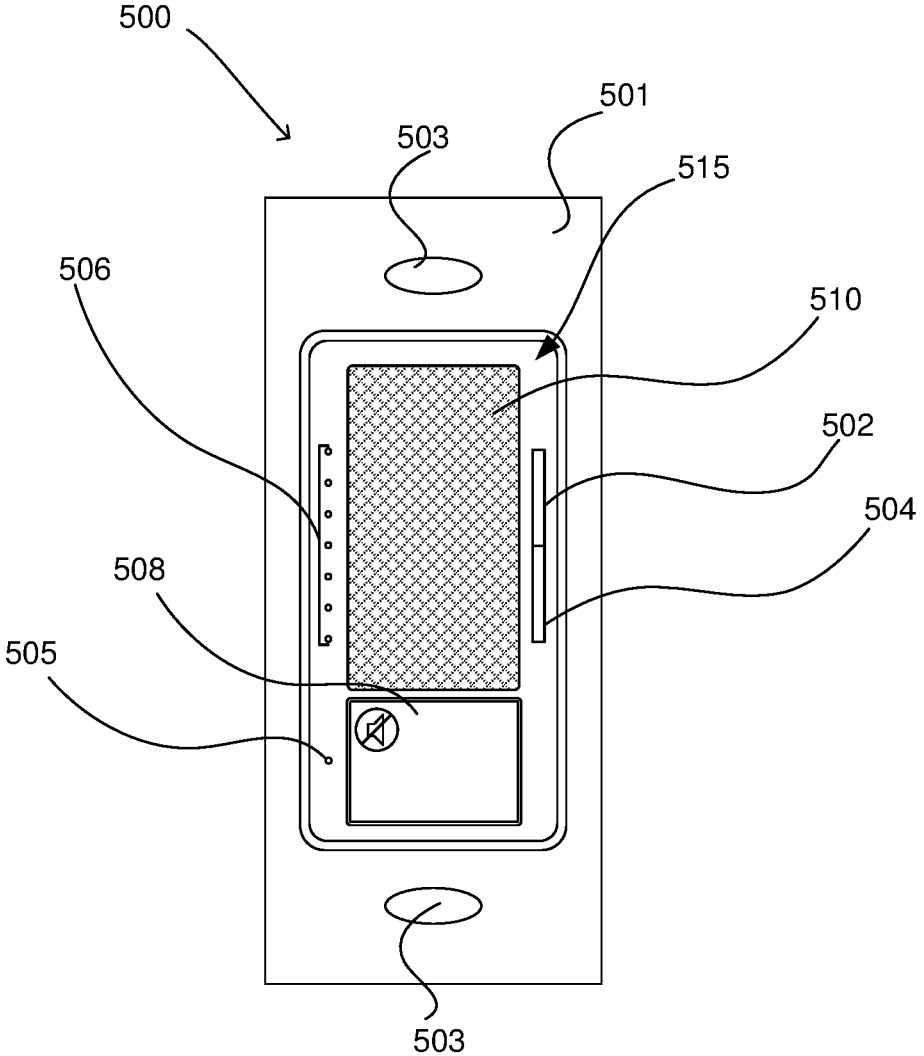
FIG. 5 is an example audio device with a privacy button.

FIG. 5 is an example of an audio device 500 according to a another embodiment. Similar to the audio devices shown in FIGS. 2 and 3, the audio device 500 may additionally have a microphone, speaker, protective cover 510, volume adjustment actuators 502, 504, and privacy LED 505, as well as other elements similar to these figures and labeled with corresponding numbers. Alternative to the protective cover shown in FIGS. 2 and 3, the audio device 500 may include a mute or privacy button 508 located on a front surface 515. A user may physically press the privacy button 508 to stop or prevent the audio device from detecting and/or transmitting audio. The privacy button 508 may be a physical button actuator, or the button may be a capacitive or resistive touch area. When the privacy button 508 has been pressed, the privacy LED 505 may turn on to indicate that the device is in privacy mode.

The circuit for LED 505 may be designed such that LED 505 is a true privacy indicator; that is, the LED is not able to be compromised by malicious software, as will be discussed in further detail herein. Conversely, LED 505 may remain on while the audio device 500 is not in privacy mode, and turn off when the privacy button 508 has been pressed. The audio device 500 may also have a design as similarly shown in FIG. 4, where the switch 444 may be the privacy button 508. This configuration may also enter privacy mode by receiving a command from the communication circuit 424.

The privacy indicator, or LED 505, shown as privacy LED 440 in the block diagram of FIG. 4, may be a true privacy indicator, that is, the privacy indicator may be coupled to the power of the microphone. The true privacy indicator may rely on the microphone power to either turn the LED on or off. The coupling between the true privacy indicator and the microphone power may ensure that the true privacy indicator may not be manipulated or falsely altered in state by malicious software.

Figure 6:
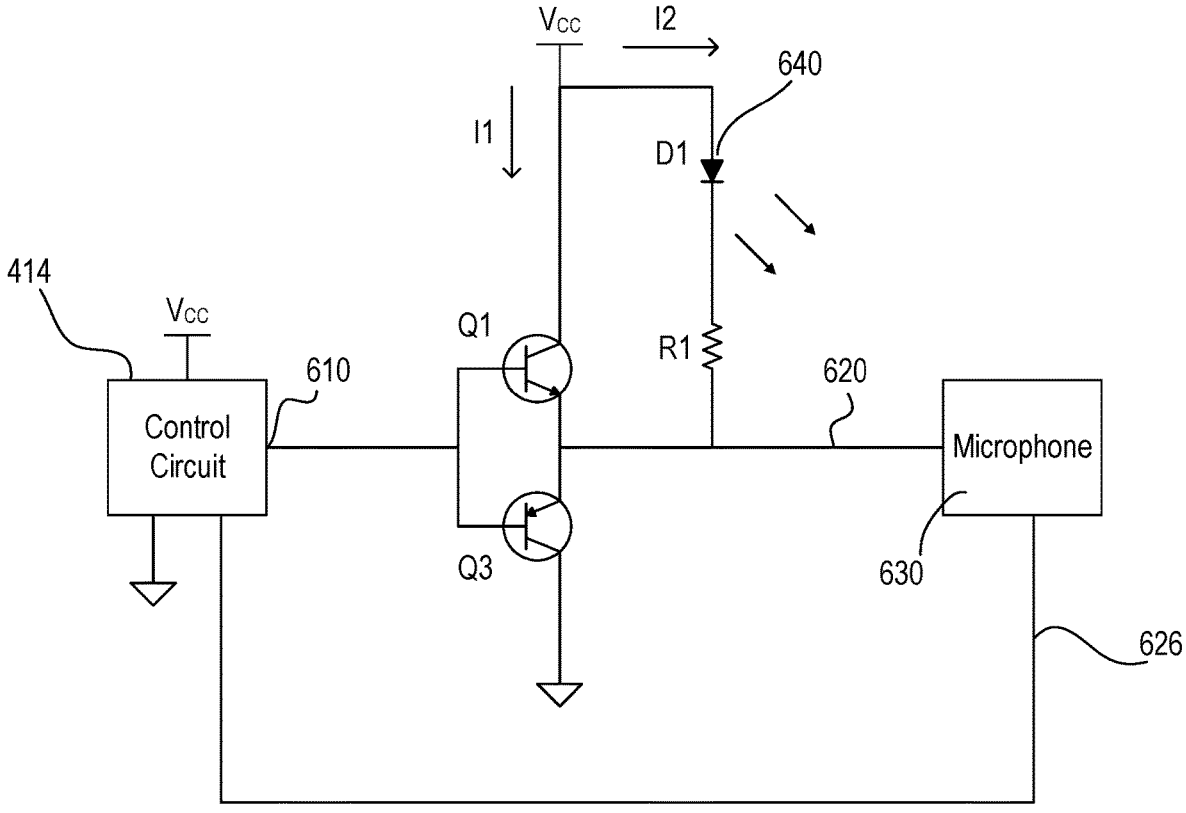
FIG. 6 is an example diagram of a true privacy indicator for an audio device.

FIG. 6 is an example schematic diagram of a true privacy indicator for an audio or video device. The true privacy indicator may be an LED D1, that is, privacy LED 640, which may be similar to the LED 440 shown in FIG. 4. The LED 640 may be hard-wired to change state when the audio device is placed in privacy mode. For example, the LED 640 may turn on when the audio device is placed into privacy mode, and turn off when privacy mode is disabled. Alternatively, LED 640 may turn off when the audio device is placed into privacy mode, and turn on when privacy mode is disabled. The true privacy indicator may also include additional circuitry, shown here as a PNP bipolar junction (BJT) transistor Q3, an NPN BJT Q1, and a resistor R1. One will understand that other types of transistors, for example, field-effect transistors (FETs) may alternatively be used.

The state of the LED 640 (that is, on or off) may be physically tied to the state of the microphone, and may not be independently controllable via software. For example, the microphone 630 may have a power supply line 620 that is controlled by the control circuit 614, and at least one other line 626. For example, the microphone 630 and the control circuit 614 may correspond to the microphone 430 and control circuit 414 of FIG. 4. Line 626 may be a data or communication line, which may be connected to the control circuit 614 as previously shown and described with reference to line 426 in FIG. 4. The control circuit 614 may have a privacy enable pin 610. The privacy enable pin 610 may control whether or not power is provided to the microphone 630 on the microphone power supply line 620. The privacy enable output pin 610 may be controlled based on a privacy mode input. For example, the privacy mode input may be provided when a user places the audio device in a privacy mode. For example, the control circuit may control the privacy enable pin 610 in response to a button press (i.e., a user has pressed the mute or privacy button, for example, button 508, or has slid a privacy cover over the microphone, thereby depressing a switch, for example, privacy cover 208, 308), as in the embodiments shown in FIGS. 2, 3 and 5. Or, the button press may be a remote button press, as in a remotely enabled privacy mode. That is, a user may press a button on a device separate from the audio device to place the audio device (and/or additional audio devices) into privacy mode. For example, a user may press a software button on a graphical user interface (GUI) of a mobile phone, or a button on a remote control, keypad, etc., to place the audio device into privacy mode. The control circuit may control the privacy enable pin 610 in response to receiving a wireless/wired communication that a remote privacy button has been pressed.

As shown here, the LED 640 may be connected in series electrical connection between the power supply line 620 of the microphone 630 through a resistor R1, and the power supply $V_{CC}$; however, the LED 640 has no direct line of control from the control circuit 614. In this way, the LED 640 may be a true privacy indicator, such that a malicious software update may not be capable of falsely turning on (or off) the LED 640 to falsely convince a user that the device is in privacy mode while the microphone is still active.

When the privacy enable pin 610 is pulled up to a logic high level (e.g., to $V_{CC}$), the transistor Q3 may be off and transistor Q1 may be on. When transistor Q1 is turned on, current may flow from $V_{CC}$ along a current path I1. That is, the current path from $V_{CC}$ may go through the transistor Q1 to supply power to the microphone on power supply line 620, and bypassing a higher resistance path I2 through D1 (LED 640) and R1. Therefore, the privacy indicator LED 640 may normally be off when the microphone 630 is on (i.e., when the microphone has power).

When the privacy enable line 610 is pulled to a logic low voltage (e.g., zero volts) as a result of putting the device in privacy mode, the transistor Q1 may turn off and transistor Q3 may turn on. When transistor Q3 turns on, current may flow through the current path I2 from the power supply rail $V_{CC}$ through LED 640 and resistor R1 and through the body of Q3 to ground. When current flows from $V_{CC}$ through the LED 640, the LED 640 may turn on, indicating that the device is in privacy mode.

Transistor Q3 may be selected to have a sufficiently low voltage drop across the collector-emitter junction ($V_{CE}$) in the on state (i.e., the voltage between the microphone power supply line 620 and ground), such that the voltage provided to the microphone when LED 640 is on may be too low to power the microphone 630. For example, $V_{CC}$ may be 3.3 volts and $V_{CE}$ may be 0.25 volts. During normal operation (not privacy mode), the voltage supplied to the microphone may be substantially 3 volts (the voltage drop across the body of transistor Q1 may be negligible). However, when Q1 is off and Q3 is on, the voltage provided to the microphone on the power supply line 620 may be set by the voltage drop $V_{CE}$ of Q3. For example, for microphone STM MP45DT02, the power supply may require a minimum voltage of approximately 1.6 volts. When transistor Q3 turns on, thereby turning on LED 640 and providing 0.25 volts to the microphone power supply line 620, the power supplied to the microphone 630 may be below the minimum power supply range required for the microphone to turn on, and therefore, the microphone may remain off while LED 640 is powered. In this way, LED D1 may be a true privacy indicator, such that if the control circuit 614 were to experience a malicious software update, the privacy indicator LED 640 would not be controlled by the control circuit 614. Therefore, the compromised audio device would not be able to falsely turn on the privacy LED 640 while the microphone 630 remained on, or active.

The resistor R1 may be selected to set the current through LED 640. For example, for a desired LED 640 current of 20 milliamperes (mA), a $V_{CC}$ of 3.3V, a voltage drop $V_{CE}$ of Q3 in the on state of 0.25V, and a forward voltage drop across LED 640 of 2V in the on state, the voltage across R1 may be approximately 1V. Therefore, R1 may be selected having a resistance of approximately 50 ohms. For example, R1 may be 47 or 56 ohms, according to resistor series standard values and manufacturing tolerances.

One will understand that the schematic diagram shown here is only one example circuit displaying how a true privacy indicator may be accomplished. For example, the value of R1 may be adjusted based on the other components of the circuit. Also, although only one LED D1 is shown, multiple LEDs may be used. Further, other circuit components may be used in place of Q1 and Q3, etc. Additionally, as previously discussed, although the LED D1 has been described here as turning on in privacy mode and off when the audio device is not in a privacy mode, it is readily apparent that the opposite mechanism wherein the LED D1 turns off in privacy mode and on when the audio device is not in privacy mode, could also easily be envisioned and designed by one of ordinary skill in the art. Additionally or alternatively, the true privacy indicator may act to break the communication line 626 of the microphone instead of, or in addition to, the power line 620.

Figure 7:
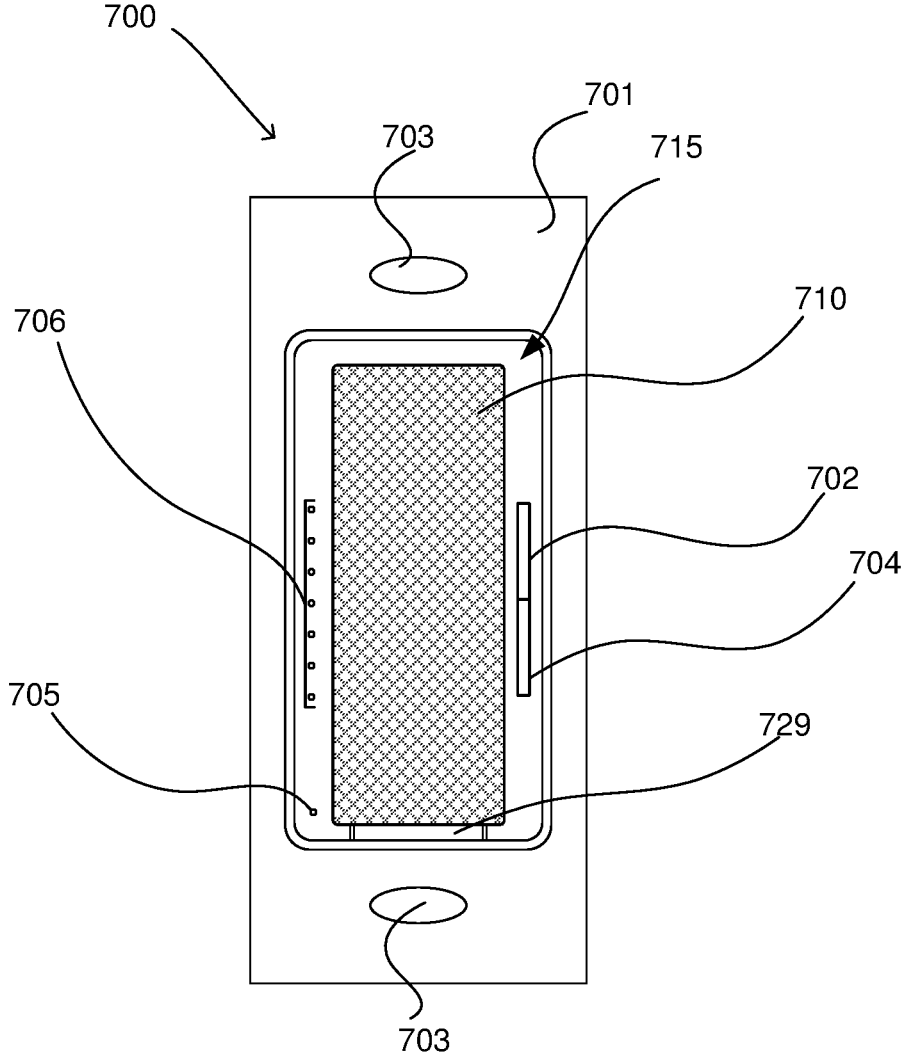
FIG. 7 is an example audio device with a mechanical disconnect for privacy.

FIG. 7 is another example audio device according to another embodiment. The audio device 700 of FIG. 7 may have similar features as the audio devices shown in FIGS. 2, 3 and 5, for example, with the privacy LED 705, LED array 706, yoke 701 with mounting holes 703, user interface on a front surface 715, protective cover 715, and volume up and down buttons 702, 704, respectively, being substantially the same as previously described.

The audio device 700 may also have a device-level privacy mode. The device-level privacy mode of audio device 700 may be a mechanical disconnect. The mechanical disconnect may be an airgap, i.e., an airgap switch shown here as airgap switch 729. Although described here as a switch, the airgap switch may be a tab, such as a push/pull control which may be either pulled out or pushed in by a user. Other mechanisms in addition to those shown here may also be used, such as rotating a knob, flipping a switch, pulling a lever, sliding a tab, etc.

Mechanical actuation of the airgap switch may break an electrical connection of a circuit of device 700, for example, similar to the circuit shown in FIG. 4. The airgap switch may be located anywhere on the audio device that is accessible to the user. For example, the airgap switch may be located on the front surface 715 of the audio device, wherein the front surface is readily exposed to a user. As one example, airgaps such as the one shown here are described in greater detail in U.S. Pat. No. 7,365,282, issued Apr. 29, 2008, entitled "PULL OUT AIR GAP SWITCH FOR WALLBOX-MOUNTED DIMMER", the entire disclosure of which is herein incorporated by reference.

The mechanical disconnect may be a single airgap, shown in FIG. 7 as airgap switch 729. That is, the airgap switch 729 may disconnect or break an electrical connection at a single point in the circuit of the audio device 700, thereby creating an airgap. For example, when a user pushes or pulls the airgap switch 729, the airgap may electrically disengage part of the circuit. The airgap switch 729 may physically break power to the entire device 700. Alternatively, the airgap may break an electrical connection of just a microphone line. For example, the airgap switch 729 may break power to the microphone. Or, the airgap switch 729 may break a communication line of the microphone. Locations of the airgap caused by the airgap switch within the circuit of the audio device will be described in greater detail herein below.

Figure 8A:
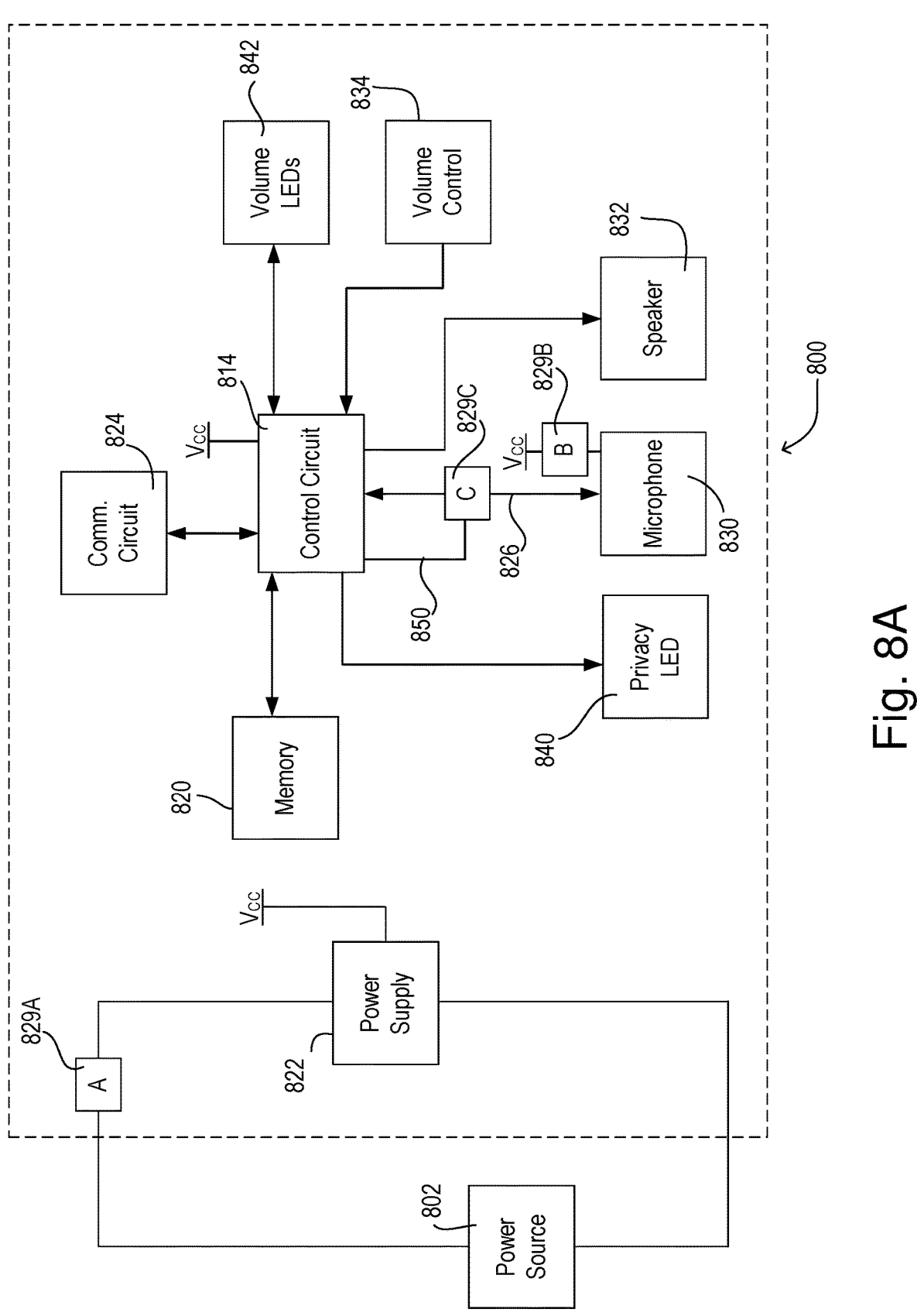
FIG. 8A is a block diagram of the example audio device of FIG. 7 with mechanical disconnects for privacy.

FIG. 8A is an example block diagram of an audio device 800 with an airgap privacy mode, as described previously for audio device 700 of FIG. 7. The audio device 800 may have many of the same components as the audio device 400 shown in FIG. 4, for example. For example, the privacy LED 840, microphone 830, speaker 832, control circuit 814, volume LEDs 842, volume control 834, memory 820, power supply 422, and power source 402 may be the same or similar to those previously described in FIG. 4. Additionally, the audio device 800 may include one or more airgaps. The airgap switch, shown here as 829A-C may be located in any of several places A-C. The airgap switch may provide a manual disconnect to place the audio device 800 into a privacy mode. The airgap switches 829A-C may enable privacy mode by breaking a power or communication connection in any of the various places indicated in the circuit to create a breakpoint, or airgap.

For example, the audio device may have an airgap 829A, which may be located at airgap position A. When the airgap switch 829A is engaged by a user, the airgap 829A may disconnect the power supply 822 from the power source 802, thereby removing power to the entire audio device 800.

Alternatively, the audio device may have an airgap switch 829B. The airgap switch 829B may be located at position B, shown in FIG. 8A as located between the output of the power supply 422 and the $V_{CC}$ rail. When a user engages the airgap switch 829B to put the audio device 800 into a privacy mode, the airgap switch 829B may break the connection providing power from the power supply $V_{CC}$ to the microphone 830. Actuation of the airgap switch 829B may not remove power from all circuitry powered by $V_{CC}$. For example, the control circuit 814, LEDs 842, microphone 830, speaker 832, communication circuit 824, and memory 820 may all remain powered from $V_{CC}$. In this way, when the audio device 800 is placed in a privacy mode through airgap switch 829B, only the microphone may lose power while other circuit components remain active. For example, the privacy LED 440 may still be used to provide a visual indication that the audio device 800 is in privacy mode.

Although not shown, $V_{CC}$ may alternatively be provided to just the control circuit 814 or to just the communication circuit 824. For example, the airgap switch 829B may alternatively remove power to just the control circuit 814 so that the control circuit 814 is unable to receive communication from the microphone 830. Or, the airgap switch 829B may remove power to the communication circuit 824. In this way, the acoustic data may still be sent from the microphone circuit 830 to the control circuit 814 to allow the control circuit to do limited local audio processing. For example, the control circuit may be able to process a keyword, or a simple learned command. However, when the airgap 829B is engaged, more extensive commands and voice conversations may not be transmitted to a network or cloud service for remote processing.

Alternatively, the audio device may have an airgap switch 829C. Airgap switch 829C may be located at position C, between the microphone 830 and the control circuit 814. When a user engages the airgap switch 829C to put the audio device 800 into a privacy mode, the airgap switch 829C may break the communication connection between the microphone 830 and the control circuit 814. That is, when a user enables or engages the privacy mode, the control circuit 814 to stop receiving acoustic data from the microphone 830. As previously described, the other components (i.e., the control circuit 814, memory 820, speaker 832, LEDs 840, and communication circuit 824) may remain powered and active while the airgap switch 829C is engaged (i.e., while the audio device 800 is in the privacy mode). Maintaining the other components in the powered or on state may allow the audio device to have an increased response time when the privacy mode is disengaged, as the other components will not go through a power cycle. One will understand that the embodiments described herein are not limited to these example placements of the airgap switch, but rather an airgap switch may be used to disconnect power or communication in any part of the electrical circuit.

Additionally, other types of mechanical privacy actuators may be used as alternative designs to achieve the same effects as the airgap switch described here. Each of these alternative designs may be considered within the scope of the invention described herein. For example, the mechanical privacy actuator may be attached to a solenoid which controls power to the microphone or voice circuitry based on the state of the solenoid.

Alternatively, the mechanical privacy actuator may maintain or break an optical connection to place the device into a privacy mode. For example, the power or communication to the microphone may be enabled or provided via a phototransistor which remains on by receiving light from a photodiode. The optical connection between the phototransistor and the photodiode to maintain the microphone circuitry may be mechanically interrupted by a privacy actuator which creates a physical barrier blocking light from the photodiode to the phototransistor.

In another embodiment, a transmitter-receiver pair of infrared or visible light diodes may optically enable power to the microphone. When the privacy actuator is enabled or placed in the privacy mode, the optical connection between the emitter and receiver pair may be broken. For example, the transmitter and receiver pair may be located adjacent to, and parallel to, each other. The transmitter and receiver pair may maintain power to the microphone by bouncing power off a reflective surface which the transmitter and receiver both face. When the privacy mode is enabled, the reflective surface may move to either expose a gap or a black surface to break the connection between the pair. Or, the transmitter and receiver pair may face each other as described with the phototransistor and the photodiode pair above.

Figure 8B:
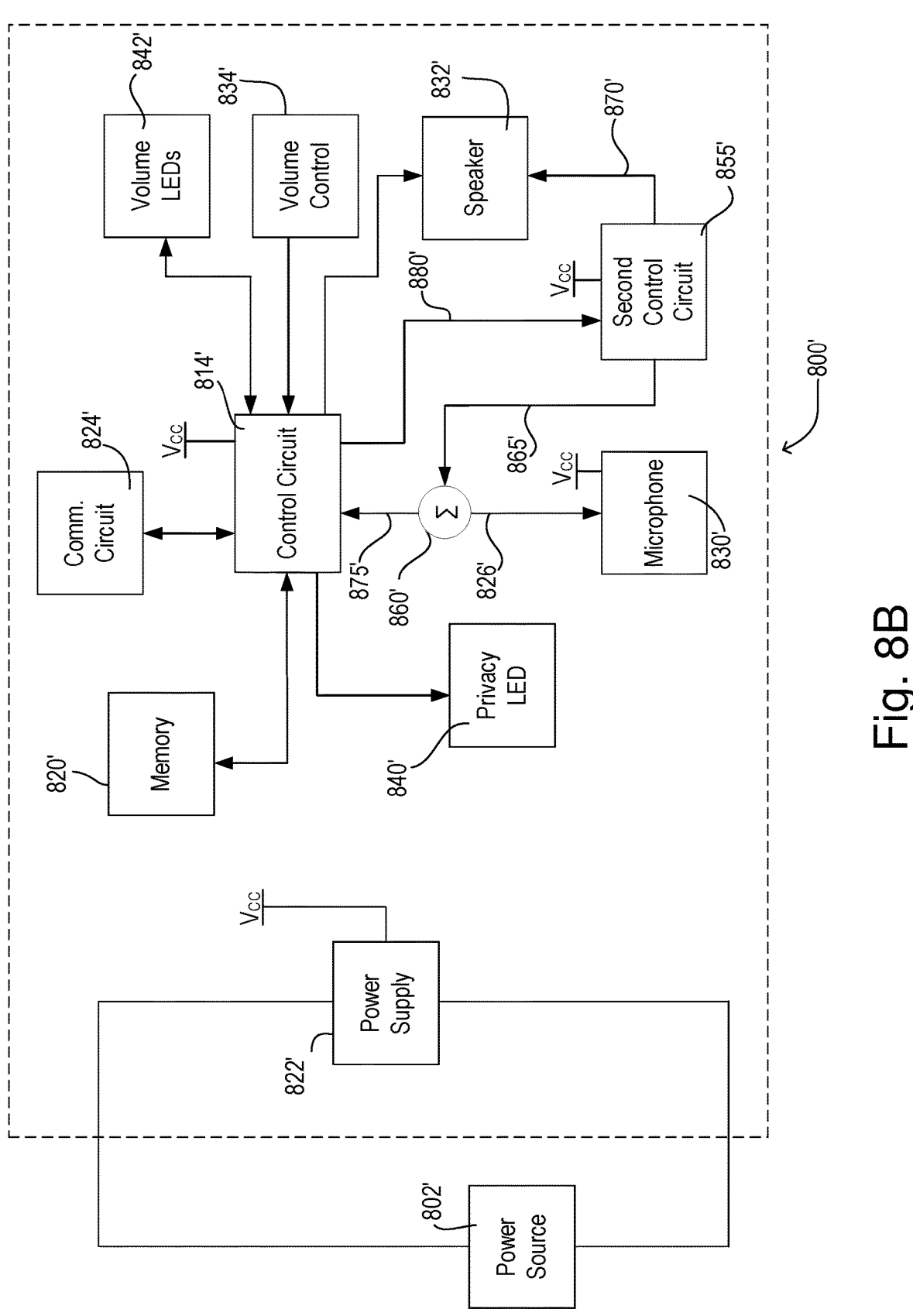
FIG. 8B is a block diagram of an example audio device with a second control circuit for introducing noise into the acoustic signal.
Figure 9:
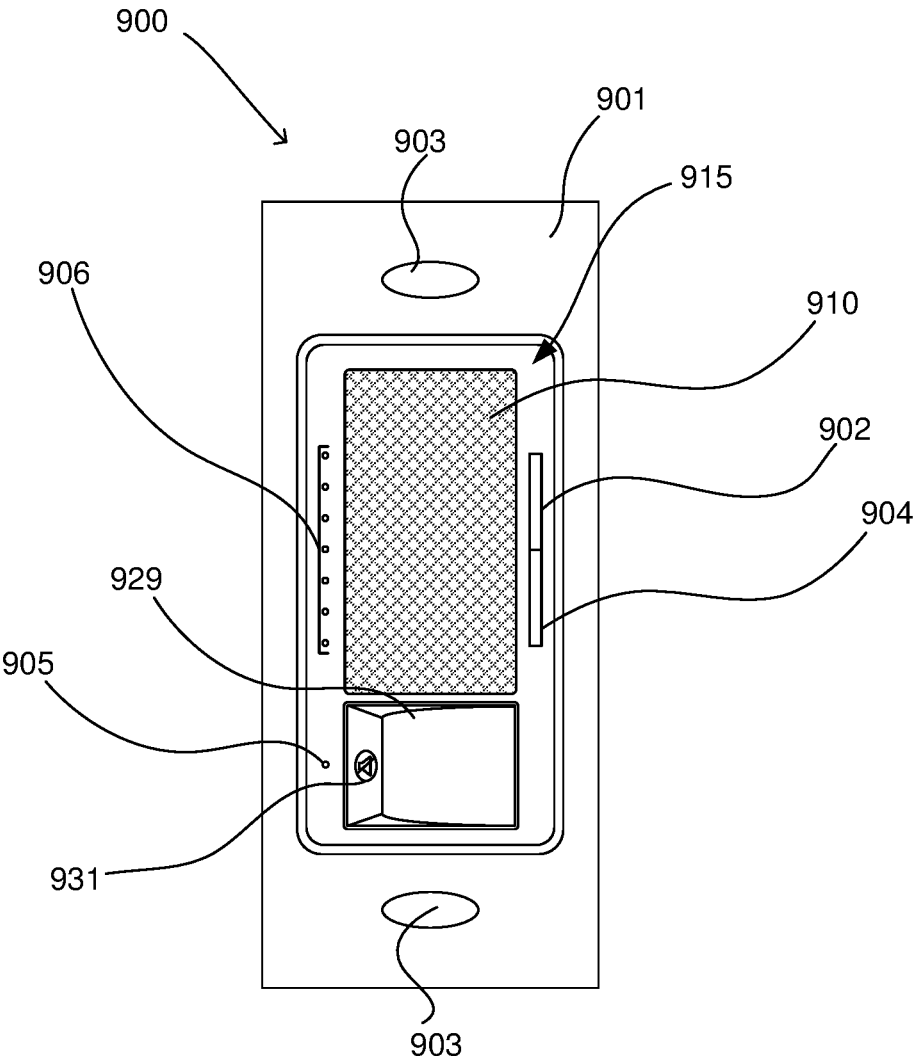
FIG. 9 is an example audio device that has a remotely resettable mechanical disconnect for privacy.

FIG. 8B is an example block diagram of an audio device 800', with similar elements as the block diagram FIG. 8A having similar numbers, having the addition of a second control circuit 855', which will be better understood as described in accordance with FIG. 9.

FIG. 9 is an example of an alternate airgap mechanism for an audio device. Audio device 900 has many similar features of the audio device 700 as shown in FIG. 7, shown with similar numbers, i.e., yoke 901 with holes 903, volume control 902, 904, privacy LED 905, LED array 906, etc. Additionally, the audio device 900 may be capable of remotely re-setting the privacy mode. The audio device 900 may include an airgap switch 929. The airgap switch 929 may be a remote reset rocker switch, i.e., a remote reset switch, which may be located on a front surface 915 of the audio device 900 and accessible to a user. For example, the airgap switch 929 may be a rocker switch that turns privacy mode on and off when a user flips or actuates the airgap switch.

The audio device 900 may provide a visual indication of privacy mode when privacy mode is enabled. For example, the audio device 900 may turn on LED indicator 905 when the airgap switch 929 is set to the privacy mode. Additionally, or alternatively, the airgap switch 929 may have an indicator area 931 that is visible when the switch is in privacy mode. That is, the indicator area 931 on the left side of the airgap switch 929 may be exposed or visible when the airgap switch is in an "on" or privacy position. The indicator area 931 may contain an icon which may indicate to a user that the audio device 900 is in a privacy mode, for example, the mute signal as shown. Alternatively, the indicator area 931 may be a color, such as red.

An example airgap switch that may be used is Remote Reset Rocker Switch A8GS, manufactured by Omron Corporation. This switch has a reset line connected to a solenoid coil that may allow a user to enable the privacy mode remotely. For example, the audio device may receive a trigger (i.e., an indication to go into privacy mode). In response to receiving the trigger, the control circuit of the audio device may cause the remote reset switch to change state to enable the privacy mode. The trigger may be any input as previously described, including, but not limited to: occupancy, a specific sound (spoken keyword or sound indicative of an activity, such as a phone ringing), a wireless command, etc. For example, the control circuit may apply a voltage to a reset line or a coil terminal of the remote reset switch to change the state of the remote reset switch in response to receiving the trigger, thereby placing the audio device in the privacy mode.

Although the privacy mode has been described as being enabled remotely, the visual indication of the position of the remote reset switch may be provided locally to a user to indicate that the airgap switch is either in privacy mode or that privacy mode has been disabled. For example, the remote reset switch may expose an icon and/or color when the remote reset switch is in the privacy mode, as previously described. The state change of the airgap switch flipping positions may also provide audio feedback confirmation to a user within the environment when the privacy mode has been set. For example, if a user remotely resets the airgap switch 929 to place the audio device 900 in a privacy mode, (i.e., transmits a wireless command to put the device 900 into privacy mode) the user may then need to physically engage the airgap switch to disable the privacy mode. That is, the privacy mode may not be disabled remotely from the device.

The audio device 900 of FIG. 9 may have a block diagram similar to the block diagram of FIG. 8A and/or FIG. 8B. The airgap switch 929 may correspond to any of the airgap switches 829A-C shown in FIG. 8A, with the addition of a reset line connecting the airgap switch to the control circuit 814 to enable the control circuit to reset the airgap switch 929C. One example is shown as the reset line 850 to airgap switch 829C in FIG. 8A. One will understand a reset line to any of the other airgaps, 829A and 829B, respectively, may alternatively be used (although not shown).

Additionally, when the airgap switch 929 is in either positions 829B or 829C as shown in the block diagram of FIG. 8A, the privacy LED 905 of FIG. 9 may also turn on to indicate that the audio device 900 is in the privacy mode. The control circuit may detect when the switch 929 has been placed in the privacy mode and may control the privacy LED 905 to turn on. For example, the control circuit may determine that the microphone 830 has stopped communicating with the control circuit (i.e., the data line connection 826 or the power supply line connection to the microphone 830 has been opened). In response to determining that the microphone 830 has ceased communication, the control circuit 814 may turn on the privacy LED 905 (shown as 840 in FIG. 8A). Alternatively, for a remote command to place the device into a privacy mode, the control circuit may reset the airgap switch 929 and also turn on the privacy LED 905. The privacy LED 905 may further be turned off when the control circuit 814 begins receiving data from the microphone 830, i.e., to indicate to a user that the device is no longer in privacy mode.

Alternatively, or in addition to, the device-level privacy modes described herein, a privacy mode may be enabled by providing interference signals. Interference signals may be acoustic interference signals (i.e., audio signals), or they may be electronic noise signals added to the microphone communication line. For example, an interference speaker may provide acoustic interference. The acoustic interference may raise the background noise level of the microphone such that the acoustic data received by the microphone from a user in the environment is not discernable from the acoustic interference by the control circuit. The noise signals may be pseudo-random noise signals generated by the control circuit. Alternatively, a separate control circuit may be used to generate the noise signals to obfuscate the acoustic data. For example, turning now to FIG. 8B, the second control circuit 855' may be used to generate noise. In this way, the primary control circuit 814' which receives the obfuscated acoustic data may not be able to subtract out the noise signal, since the noise signal was generated by an independent source, i.e., the separate control circuit.

The interference speaker providing the acoustic interference may be a single speaker or may be multiple speakers. For example, the interference speaker may be speaker 832' in FIG. 8B which is provided a noise signal 870' by the second control circuit 855'. This may be implemented in any of the audio devices described herein, including the audio devices of FIGS. 2, 3, 5, 7, and 9. The interference speaker 832' providing the acoustic interference may be integrated with the audio device, that is, may be located within the housing of the audio device. For example, the interference speaker may be the speaker 832 of FIG. 8A, and/or an additional speaker located within the housing of the audio device. Alternatively, the interference speaker may be located externally to, and proximate to, the audio device.

The acoustic interference may be an audible interference. For example, the acoustic interference may be a white noise interference. Alternatively, the acoustic interference may be a pink noise or grey noise interference. One skilled in the art will recognize that the exact acoustic spectrum of the acoustic interference is not critical; rather, the effectiveness of the interference is based on broadband coverage of audible range frequencies and having sufficient amplitude (i.e., volume) to drown out ambient conversations. That is, the amplitude of the noise signal is at least of substantially the same amplitude as the amplitude of the audio signals. Additionally, the audible nature of the acoustic interference may allow a user to have audible feedback that an interference privacy mode has been enabled. The separate control circuit may be configured to generate the acoustic noise signal and provide the acoustic noise signal to the interference speaker for broadcasting the acoustic noise signal. The noise from the interference speaker 832' may then be received by, and couple to, the microphone 830' of the audio device such that the noise signal may mix with the received speech to create obfuscated acoustic data 875'.

In addition to the interference modes described, the acoustic interference may be an ultrasonic interference. The frequency of the ultrasonic interference may be outside of the range of human hearing but within the frequency response range of the microphone. For example, the frequency may be greater than or equal to 20 kilohertz. The audio device may be designed so that the ultrasonic interference may saturate the microphone input, that is, the microphone output is substantially equal to $V_{CC}$.

Alternative to an acoustic interference, electrical noise may be added to the acoustic data. For example, the second control circuit 855' may generate an electrical noise signal 865' which is added directly or via a sum function 860' to the acoustic data 830'. The addition of the electrical noise signal 865' to the acoustic data 830' may generate an obfuscated signal 875', which may be a mix of the electrical noise signal and the noise signal. That is, the noise may be added to a communication line of the microphone 430 through the separate second control circuit. The separate second control circuit 855' may be hard-coded and not updateable via software, and additionally not connected to the primary control circuit. The separate second control circuit 855' may be used to generate the electrical noise such that the primary control circuit, i.e., control circuit 814, may not be able to cancel out or remove the noise from the acoustic data of the microphone communication line.

The control circuit 814' may provide a signal 880' to the second control circuit 855' to indicate to the second control circuit 855' when to enter the privacy mode (i.e., when to generate noise signals). When the control circuit provides a signal 880' to the second control circuit 855', the second control circuit may begin providing noise signals either electric noise signals 865' or acoustic noise 870' to create the obfuscated data 875'. Further, the primary control circuit may not be able to discern words when performing voice recognition on the obfuscated data. Alternatively, the wireless control circuit may transmit the obfuscated acoustic data to a server for voice processing, wherein the server may also not be able to discern words when performing voice recognition on the obfuscated data, thereby masking or concealing any words spoken during the time when the acoustic data has been obfuscated. When the control circuit 814' determines the device 800' is no longer in the privacy mode, the control circuit 814' may cease providing the signal 880' to the second control circuit 855' to cause the second control circuit 855' to stop generating the noise signal and thereby the control circuit 814' will cease receiving the obfuscated data 875'.

Figure 10:
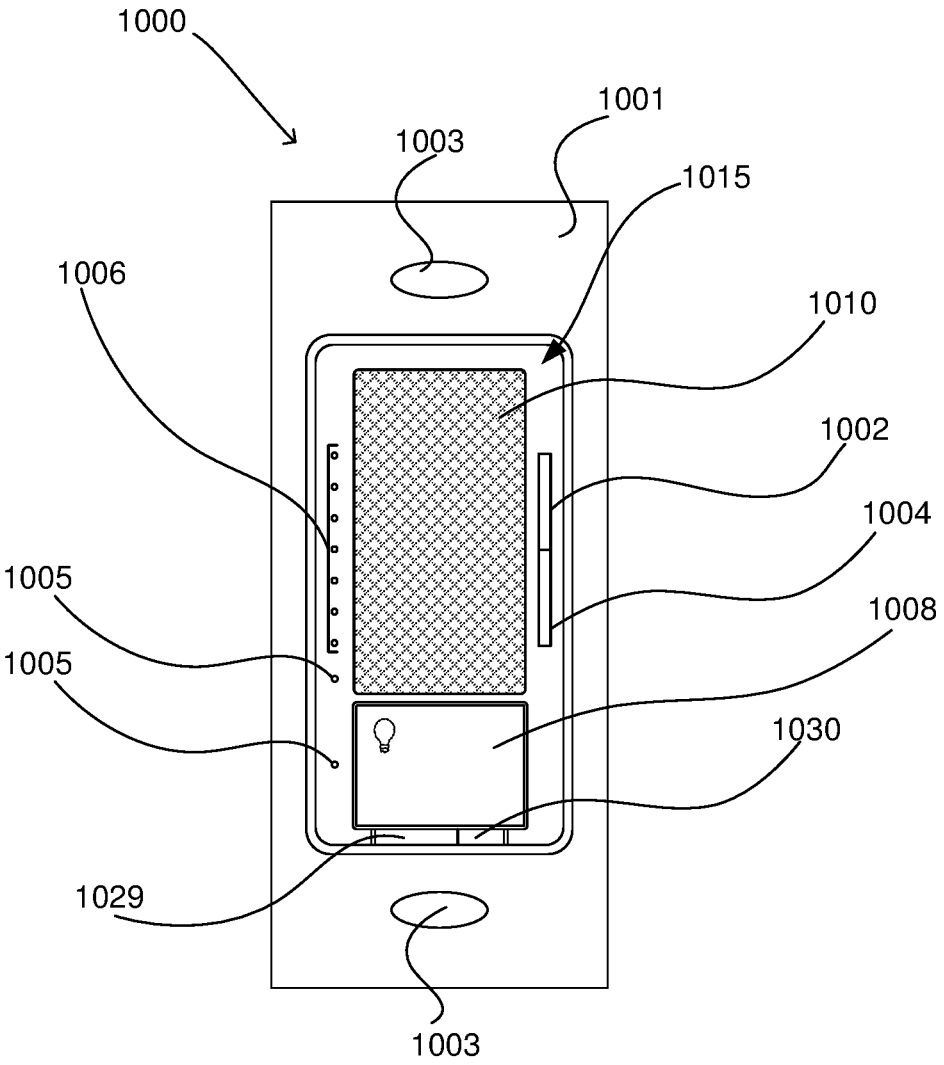
FIG. 10 is an example audio device that is also a load control device.

Any of the embodiments discussed herein may be integrated into any of the devices shown in FIG. 1. As one example, the audio device may be integrated into a load control device, such as load control device 104. FIG. 10 is an example audio device 1000 that may also be a load control device. The audio device 1000 may have many similar features as the audio devices shown and described in FIGS. 2, 3, 5, 7, and 9, and may also control an electrical load. For example, the audio device 1000 may control an electrical load such as a lighting load, a motorized window treatment, etc., such as the load control device 104 shown in FIG. 1.

The audio device 1000 may have a speaker and microphone located behind a protective cover 1010; a volume up adjuster 1002 and a volume down adjuster 1004 for adjusting a volume level of the speaker; LED indicators 1006 for showing a volume level; a privacy LED 1005; and a privacy airgap switch 1029, all similar to elements previously described in the preceding figures. One will recognize the audio device 1000 could additionally have a privacy cover as shown in FIG. 2 or 3, or it may have a mute or privacy button as shown in FIG. 5, a privacy switch or airgap switch as in FIG. 9, etc.

The audio device 1000 may additionally include an actuator 1008 for controlling an electrical load. The actuator 1008 may be a single actuator as shown, located on a front surface 1015 of the audio device 1000. A user may press the actuator 1008 to control the electrical load, such as turn a lighting load on and off, raise lower a shade. Other actuators are possible. For example, if the lights are on, a user may press the actuator 1008 to turn the lights off. Or, if the lights are off, a user may press the actuator 1008 to turn the lights on. Alternatively, the actuator 1008 may include multiple actuators. For example, the load control device 1000 may control an electrical load such as a lighting load. The actuator 1008 may include an on/off actuator, and one or more additional actuators for dimming a lighting load up and down.

The audio device 1000 may also include an indicator LED 1005. The indicator LED 1005 may indicate the state of the load. For example, the indicator LED may turn on when the load is on, and the indicator LED may turn off and/or appear dark when the load is off. The indicator LED may also be incorporated with the actuator 1008. Audio devices with integrated load control will be described in greater detail herein.

The audio device 1000 may further include a second airgap switch 1030 which may turn off power to the entire device. For example, a user may disconnect airgap switch 1029 to put the audio device 1000 into privacy mode without losing the ability to control the load (i.e., pulling out the privacy airgap switch 1029 may not remove power to the load controlled by the audio device load control 1000). However, a user may disconnect power to the load via the airgap switch 1030. For example, a user may pull out the airgap switch 1030 to remove power to a light fixture to change a lightbulb within the light fixture.

Figure 11:
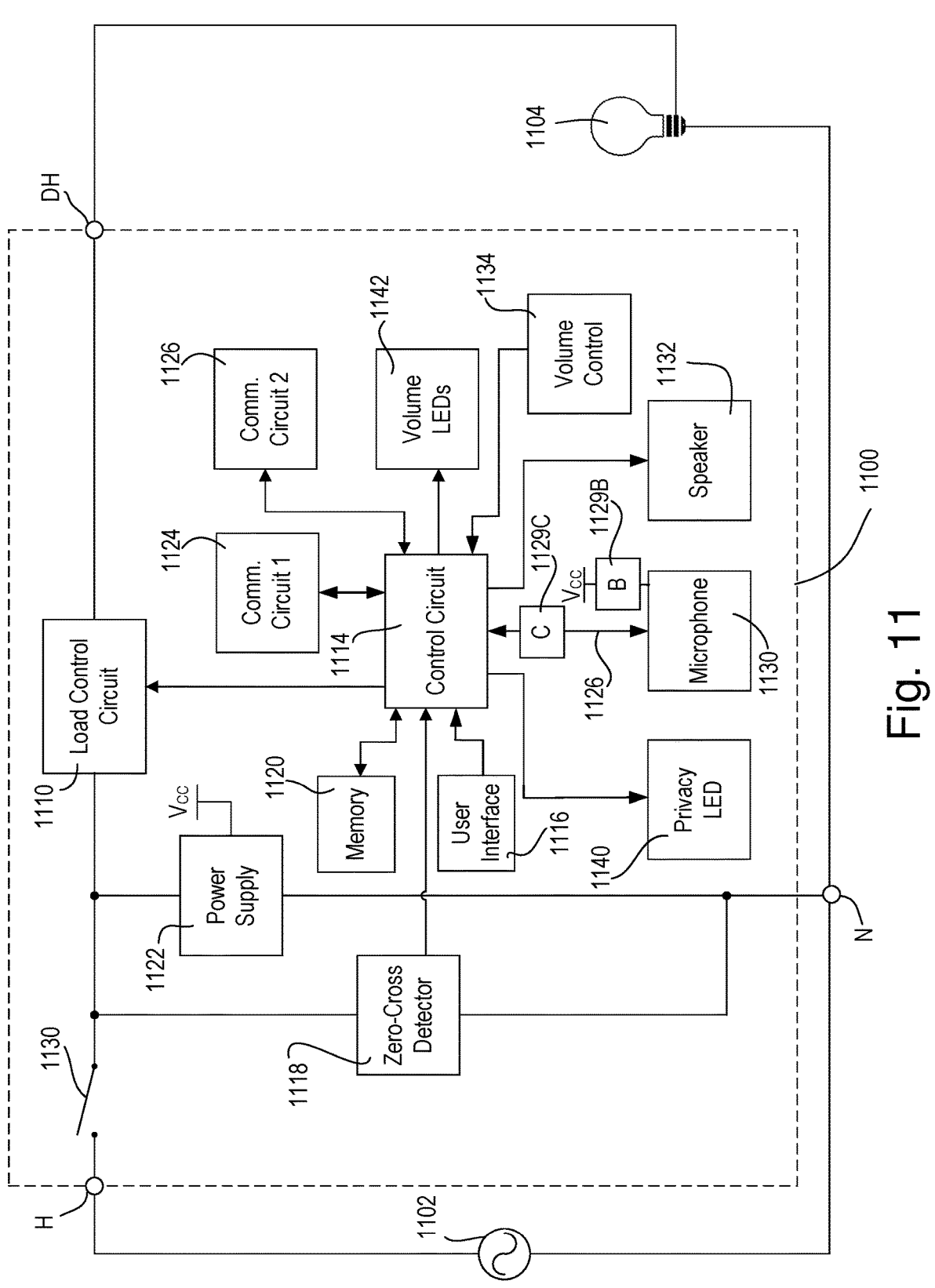
FIG. 11 is a block diagram of the audio device of FIG. 10 that is also a load control device.

FIG. 11 is an example block diagram of an audio device 1100 with integrated load control, such as device 1000 shown in FIG. 10. In this example, device 1100 is an audio device that is also a control device for a lighting load. The audio device 1100 may have similar circuitry as the audio device 800, 400 shown in FIGS. 8, 4, respectively. For example, the audio device 1100 may have one or more privacy LED(s) 1140, a volume control 1134, one or more volume LEDs 1142, microphone(s) 1130, speaker(s) 1132, privacy airgaps 1129B and 1129C, etc. One distinction here is that the privacy airgap switch shown in FIG. 8A as 829A is now a separate airgap switch 1130, which is electrically located in the same area of the circuit 1100 as the circuit 800; however, airgap switch 1130 also now removes power to the electrical load 1104. The airgap switch 1130 corresponds to the airgap switch 1030 as previously described in FIG. 10.

Additionally, the audio device 1100 may have load control circuitry. The audio device 1100 may have a hot terminal H for receiving power from an AC line voltage 1102. The audio device 1100 may have a dimmed hot or switched hot terminal DH for providing power to a load 1104. The load 1104 may be a lighting load, such as an LED, a compact fluorescent lamp (CFL), incandescent lamp, halogen lamp, etc. The audio device 1100 may additionally have a neutral terminal N, or may be referenced to an internal ground reference.

The audio device 1100 may have a zero-cross detector 1118 and a load control circuit 1110. The zero-cross detector 1118 and the load control circuit 1110 may both be electrically connected to the hot terminal H and the control circuit 1114. The zero-cross detector may monitor the line voltage from the hot terminal H to detect when the line voltage reaches a minimum. When the line voltage reaches a minimum, the zero-cross detector may provide a zero-cross timing signal to the control circuit 1114. The control circuit may control the load control circuit 1110 based on the zero-cross timing signal provided by the zero-cross detector 1118. For example, the control circuit 1114 may control the load control circuit 1110 to provide a dimmed hot signal on terminal DH, where the dimmed hot signal may use phase angle dimming. The firing time of the load control circuit to provide the desired phase angle of the dimmed hot signal may be based on the zero-cross signal from the zero-cross detector 1118. The load control circuit may be a controllably conductive device, such as a triac, silicon-controlled rectifier (SCR), field-effect transistor (FET), or the like.

The audio device 1100 may further include a user interface 1116 for controlling the electrical load 1104. The user interface 1116 may be electrically connected to the control circuit 1114, and may include one or more actuators (on/off, dim, etc.). The control circuit 1114 may control the load control circuit 1110 based on user input received from the user interface 1116. For example, a user may actuate an on or off switch on the user interface 1116 of the audio device 1100, and the audio device 1100 may control the load 1104 on or off in response to receiving the user input at the user interface 1116. Additionally, or alternatively, the user input may comprise dimming actuators for dimming the load 1004 up and down.

The audio device 1100 may include a second communication circuit 1126. The communication circuit 1126 may be operatively coupled to the control circuit 1114. The communication circuit 1126 may be a wireless or a wired communication circuit and may receive wireless or wired signals from remote devices, such as a remote which may send load control commands to the load control device; a hub; a router; etc. The signals received by the communication circuit 1126 may contain load control commands. The control circuit may receive the signals from the communication circuit 1126 and may control the load control circuit 1110 based on the received signals. Such signals could alternatively/additionally be received on communication circuit 1124. Alternatively, and/or additionally, the signals received on 1126 may be a privacy setting command from a remote device such as a hub, router, keypad, remote, etc. The control circuit may receive and process the remote privacy command from the communication circuit 1126, and may further determine to put the audio device 1100 into privacy mode as described previously in response to receiving the remote privacy command. The communication circuit 1126 may communicate via Wi-Fi, Wi-MAX, Bluetooth®, Zig-Bee®, Z-Wave, Thread, or a proprietary protocol (e.g., the ClearConnect® protocol), etc.

In addition to the embodiments currently described, an audio device may use any combination of the disclosed privacy methods. For example, an audio device may have a privacy or mute cover, as shown in FIG. 2 or 3, and may also include a mute button, and/or be controllable from a remote command, etc.

Figure 12:
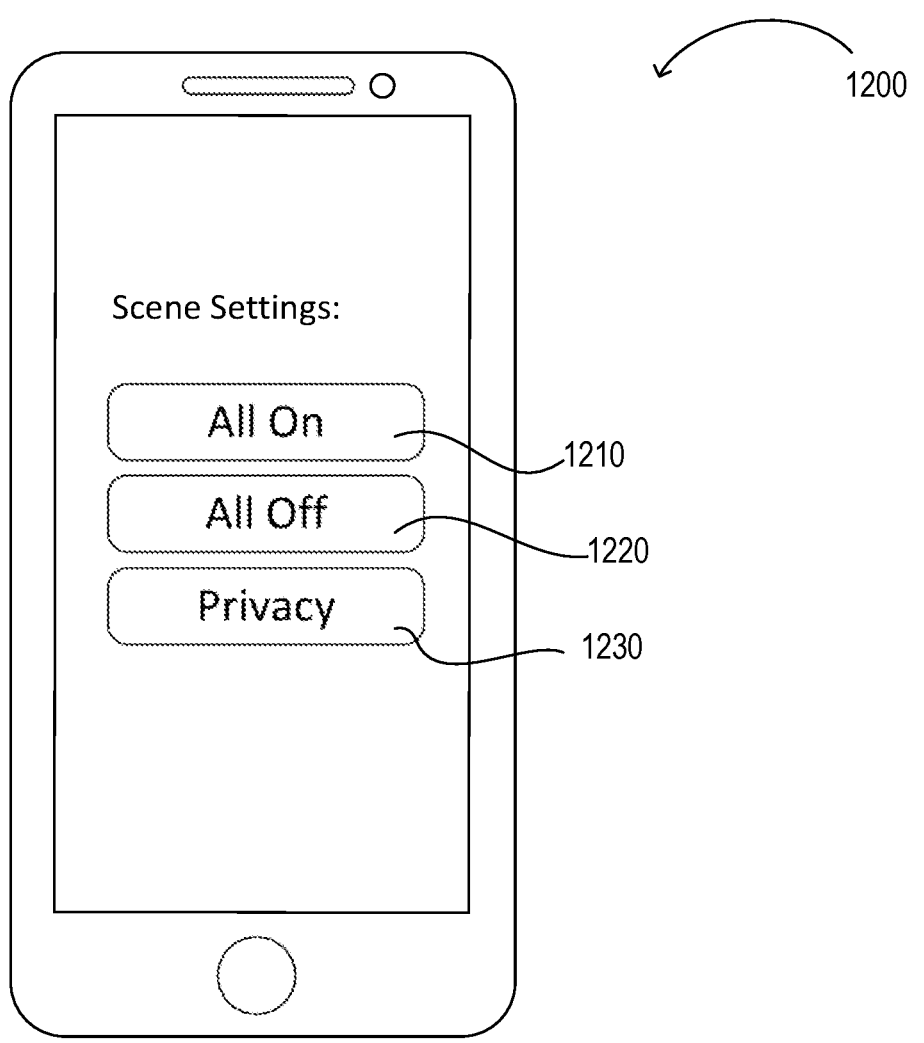
FIG. 12 is an example privacy mode selection on a mobile device.

FIG. 12 is an example of a remote privacy mode setting made available to a user via a graphical based application from a device such as a mobile device 1200, PC, laptop, etc. Alternatively, it may be provided as a web based application. The remote privacy mode may be for a specific audio device or it may be setup as a scene, wherein multiple devices may respond to the privacy mode command. In one example, the user may press a software button on a mobile application on a mobile device, such as mobile device 115 of FIG. 1, to place one or more of the audio devices into privacy mode.

FIG. 12 shows one such example of a mobile device 1200 with various scene settings. The mobile device may have one or more scene options selectable by a user. The scene options may be displayed on a graphical user interface (GUI) of a mobile application. The mobile device 1200 shows several example scenes that may be available for a user to select. When a user selects a scene, the mobile device may wirelessly communicate with a hub device, wherein the hub device may send a scene command to the load control devices in the user environment to go to the selected scene. Alternatively, the load control devices may receive the scene command directly from the mobile device. In response to receiving the scene command, the load control devices may control their respective loads. For example, load control devices may turn on electrical lighting or HVAC loads, motorized window treatments may adjust a level of a window covering, etc., in response to the scene command. In addition, audio devices may determine whether to respond to the scene command to place the audio device into a privacy mode.

In one example, the mobile application may have an All On scene 1210, which turns on the devices that are part of the All On scene. For example, any load control devices located in the user environment may turn on their respective electrical lighting loads, and/or motorized window treatments may open respective window coverings, etc., in response to the "All On" command. The mobile application may have an All Off scene 1220, which may turn off all the devices that are part of the All Off scene. For example, any load control devices located in the user environment may turn off their respective electrical lighting loads, and/or motorized window treatments may close respective window coverings, and/or the HVAC may turn off or go to a setback temperature in response to the "All Off" command.

Additionally, the mobile device may have a Privacy scene 1230. The Privacy scene 1230, when actuated by a user, may send a command to one or more devices to enable privacy mode. For example, a user may press the Privacy button 1230 on the mobile device 115 of FIG. 1 to place the audio device/load control device 104 into a privacy mode. The mobile device 115 may transmit (i.e., wirelessly transmit) the privacy command either directly to the audio device, or may transmit to the hub device 129 (directly or through the router 127 or Internet server), wherein the hub device 129 may then send the privacy command via a wired or wireless connection to the audio devices in the user environment.

Although the audio devices have been described as enabling a privacy mode in response to a remote privacy command, the audio devices may alternatively disable or disengage from the privacy mode in response to a remote command. That is, a command to turn off privacy mode may turn off privacy mode for one or more audio devices in the user environment. Additionally, although privacy mode has been described for audio devices, one will understand that other devices which monitor a user environment may also have a privacy mode and may additionally be responsive to the privacy command. For example, devices which record video, such as video intercom 120 and security camera 122, may also have a privacy mode for the video recording. In this example, the privacy button 1230 may place the audio device/load control device 104, video intercom 120, and security camera 122, each into privacy mode to stop transmitting data, thereby securing the privacy of the user environment 100. For example, the privacy mode may cause each device to cease transmitting data to the hub device 129 or the router 127. Additionally, or alternatively, the privacy mode may cause each device to cease transmitting data to any other device. For example, the security camera 122 may transmit data to a security system. In this case, the privacy mode button may be configured to stop the transmission of data from the security camera 122 to the security system. Similar to the privacy airgap switches as described for audio devices, one or more privacy airgap switches may be used for video devices to remotely break an electrical connection in the video circuit. Or, a control circuit of the video devices may stop transmitting or processing the video feed in response to receiving a privacy command.

This remote-level privacy mode may allow a user 102 to place a device into privacy mode while the user is not proximate the device, i.e., while the user is located remotely from the device. The remote-level privacy mode may provide a single control point for a user to place multiple devices within the user environment 100 into a privacy mode.

For example, the remote-level privacy mode may provide a single point of control for a hotel room, conference room, or a room of a residence. Alternatively, the remote-level privacy mode may be used as a single control point to place an entire building into privacy mode.

As another example, the remote-level privacy mode may be engaged through other mechanisms. For example, the remote-level privacy mode may be engaged or entered by any number of triggers, e.g., a button press, a voice command, short-range communication, gesture, or triggered based on a condition. For example, the remote-level privacy mode may be enabled by a button press. In addition to the button press on a mobile application previously described, the remote-level privacy mode may be engaged through a button press on keypad 106 of FIG. 1. Alternatively, the remote-level privacy mode may be engaged through a button or airgap switch mechanism on the hub device 129. For example, a user may press a button on keypad 106, or a button or airgap switch on hub device 129, to place all the audio and/or video devices of room 100 which record and transmit sensitive data (i.e., audio and/or video feeds) into privacy mode.

Alternatively, the remote privacy mode may be remotely enabled via a voice command. For example, a user 102 may speak a voice command, such as, for example, "privacy mode". The voice command may be received by an audio device, such as audio device 104. The audio device may determine whether the voice command is a privacy command. That is, the voice command may act as a keyword, or wake word, which is processed locally by the control circuit of the audio device. When the audio device 104 determines that the voice command is a privacy command, the audio device 104 may enable privacy mode. Each of the audio devices in the room 100 may be responsive to the privacy command. Alternatively, only the hub device 129 may be responsive to the keyword of the voice command to enter privacy mode, and the hub device may send a privacy command to the respective devices in the user environment 100. For example, the hub device 129 may be an audio device and may include additional audio processing circuitry to allow for multiple keywords, such as privacy keywords. In this way, each audio device in the room may not require additional audio processing circuitry. For example, the hub 129 may receive the voice command from the user 102 to go into privacy mode, and the hub 129 may transmit a privacy command to the load control device 104, security camera 122, and the video intercom 120 via wireless signals 108, for example.

The voice command to trigger privacy mode may be a command setup by a user. Or, the voice command may be based on a specific keyword. For example, the privacy mode may be automatically engaged in response to the detection of specific keywords such as "bank", "account", or "pin" are received at an audio device. Privacy mode may also be engaged when numerical digits are read out loud. In this way, the privacy of verbally spoken credit card, bank account, social security, and/or phone numbers may be maintained, and not transmitted by the audio device. In addition to any of these words, any keyword may be used to trigger privacy mode. Additionally, the audio device may locally (or through processing on a remote server), determine context along with a trigger word before enabling privacy mode. For example, the audio device may look for a combination of keywords such as "bank" and "account", or "account" and "number" or "pin".

Privacy mode may also be enabled based on short-range communication from a privacy device. For example, a privacy device may be a remote control or even the mobile device 115. The privacy device may wirelessly send a privacy command to the audio device to put the audio device into privacy mode. For example, the privacy device may transmit a privacy command over short-range communication. Short-range communication may be any one of acoustic, visible light, infrared light, radio-frequency (e.g., near-field), or any other type of short-range communication. The privacy device may have a wireless communication circuit and a privacy mode button for receiving a user input. A user may press the privacy mode button on the privacy device to transmit a privacy command via the wireless communication circuit to other devices in the space.

Privacy mode may alternatively be enabled or disabled based on a gesture from a user. The user may gesture to the audio device or to a privacy device to put the audio device into privacy mode. Examples of gesture-based control of devices is described in more detail in U.S. Patent Application Publication No. 2016/0224036, entitled "GESTURE-BASED LOAD CONTROL VIA WEARABLE DEVICES", filed Jan. 29, 2016, the entire disclosure of which is herein incorporated by reference.

Alternatively, privacy mode may be triggered based on a condition. The condition may be based on a specific user or activity. For example, a certain user may always want the devices in privacy mode. In this case, the respective devices, or the hub device, may include the appropriate sensors and software to recognize the user and trigger privacy mode based on the user's presence, or an external camera or sensor may be used. For example, privacy mode may be triggered based on voice recognition, facial recognition, or gait recognition of the user. As an example, a given room may have a camera configured with a facial recognition application. The camera may be configured to recognize a given user or gesture. Upon detecting a given user or gesture, the camera may send a privacy command. The audio device may enable privacy mode based on the privacy command. Examples of user recognition by visible light sensors is described in more detail in U.S. Patent Application No. 2017/0171941, entitled "LOAD CONTROL SYSTEM HAVING A VISIBLE LIGHT SENSOR", filed Dec. 9, 2016, the entire disclosure of which is herein incorporated by reference.

Additionally, privacy mode may also be triggered based on proximity of wireless beacons specific to a user, such as the user's phone, wearable device, or other remote communication device specific to the user. For example, the audio device or the hub device 129 may be configured to recognize a given wireless beacon. Upon detecting the beacon, the audio device may enter a privacy mode. Or, the hub device 129 may detect the beacon and send a privacy command to the audio device to go into a privacy mode. Once the audio device or hub device 129 has stopped detecting the beacon, the audio device may disable or disengage the privacy mode. Examples of user recognition based on beacons is described in more detail in U.S. Patent Application No. 2016/0056629 filed on Aug. 21, 2015, entitled "LOAD CONTROL SYSTEM RESPONSIVE TO LOCATION OF AN OCCUPANT AND MOBILE DEVICES", the entire disclosure of which is herein incorporated by reference.

Privacy mode may also be triggered based on any other type of geofencing technology present in the user's phone or remote communication device. It is known, for example, to trigger a scene based on geofencing (i.e., a user has crossed a geofenced area, such as arriving at their home). Home control systems such as Caséta, manufactured by Lutron Electronics Co., Inc., have a geofencing feature that turns on a scene based on a user crossing a geofenced area. This could be extended to include a privacy scene or mode based on geofencing.

Privacy may be triggered based on other conditions, such as a detected activity. For example, the privacy mode may be triggered when a user receives a phone call. The mobile device 115 may detect when a phone call is received and transmit a command to one or more devices, or the hub device 129, to go into privacy mode. Alternatively, the audio devices may recognize specific activities and may enable privacy mode when the specific activity has been detected. For example, the audio device 104 may receive an acoustic sound. The audio device 104 may identify the acoustic sound as a ringtone, determine that a user is receiving a phone call, and based on the determination, the audio device 104 may enable privacy mode. For example, the remote server 140 may continually process audio data and may compare the data to a database of known or learned sounds. When the audio device determines that a sound is an incoming phone call, for example, the audio device may enter or enable the privacy mode.

For the remote privacy modes described herein, the privacy mode may be enabled (or disabled) at a device level, room level, or building level, as setup by a user. Additionally, the privacy mode may be enabled indefinitely until a user disables the privacy mode, and vice versa. For example, the user may physically disable the privacy mode by any one of the following methods: removing a privacy cover; re-engaging a privacy airgap; turning off an interference; etc. For added security, the privacy mode may need to be physically disabled at the device.

Alternatively, the privacy mode may be disabled remotely through a secure transmission. For example, a user may remotely disable the privacy mode using a mobile device, such as mobile device 115, that has a security key to unlock the security mode. In one example, the security key may be an optical security key, and the user may optically unlock the security mode through LiFi. That is, the mobile device may flash a security key via the display or the camera flash, which may be received by a light detector or sensor of a hub device, such as hub device 129, or other control device, such as the load control 104, to disable the privacy mode. The security key may be specific to the user 102. This method may be used for disabling the privacy mode as described herein, or for enabling or engaging the privacy mode.

The privacy mode may be used with a timeout counter. For example, privacy mode may be enabled for a finite period of time using the timeout counter, and when the timeout counter has expired, the audio device may exit the privacy mode. For example, the privacy mode may be enabled for an hour-long meeting, and after the hour, the privacy mode may be disabled.

The countdown of the timeout counter may be done by the control circuit of the audio device, or by the hub device 129 which may then send a command to the audio device at the end of the timeout. The audio device (or the hub device 129) may include a counter, and the control circuit may use the counter to determine a timeout.

The length of the timeout may be configurable, whereby a user may initially setup the audio device with a specific timeout (e.g., one hour), or may add a timeout when enabling the privacy mode. A user may configure the length of the timeout either through an advanced programming mode on the audio device, or through a GUI application on a mobile device, laptop, PC, etc. Alternatively, a user may vocally command the audio device to instruct the privacy timeout length. For example, a user may say "Privacy, 10 minutes", where "privacy" is used as a keyword to enable privacy mode, and "10 minutes" specifies the length of the timeout.

As another (or additional) example, the timeout counter may be used to disengage privacy mode. For example, a user may press a button to disengage privacy mode for 10 seconds, to make a request, for example, after which privacy mode is automatically re-enabled. Or, the privacy mode may be disengaged the entire time a button is pressed, i.e., push-to-talk mode. A user may push the button while talking to disengage the privacy mode and allow the audio device to receive the spoken request from the user. When the user stops pressing or pushing the button, the audio device may return to privacy mode and stop recording or listening to acoustic data. For example, the button may be a physical button such as an actuator or capacitive touch area on the audio device, such as the privacy button or privacy switch of FIGS. 5 and 9. Or, the button may be a physical button on a remote device, such as a remote or keypad. Alternatively, the button may be a soft button on a mobile device, laptop, PC, etc.

Alternatively, the privacy mode may be enabled or disabled based on a condition or event. For example, the user environment may contain an occupancy sensor. The occupancy sensor may be configured to communicate with the audio device, wherein the audio device may enable or disable the privacy mode based on an occupancy detection within the room. The audio device may also use a timeout counter with the event-based or condition trigger. For example, the audio device may disable the privacy mode for the first 30 seconds after occupancy has been detected in the room. In this case, occupancy may be sensed by the audio device itself, or may be received by the communication circuit from an occupancy sensor or the hub device 129.

Alternatively, privacy mode may be automatically set for a room, such as a conference room, based on a calendar meetings schedule for that room. For example, a user may book or schedule a conference room for a particular time period using calendar software (such as Microsoft Outlook, for example, manufactured by Microsoft Corporation). The user may indicate in the meeting appointment that the meeting is confidential, for example, by setting the meeting to private, including the words "confidential" or "private" in the meeting subject or body, or using an additional setting to mark it confidential or indicate that a private meeting is desired, etc. Based on the calendar meetings schedule, privacy mode may then be enabled for the room during the time period when the confidential meeting is scheduled. After the meeting is concluded, each of the devices in the meeting room may return to their normal (i.e., non-privacy mode) states. The end of the meeting may be determined based on when the time period of the calendar meeting has passed. Alternatively, the end of the meeting may be determined by the occupancy state of the room, i.e., when one or more occupancy sensors detect that the room is unoccupied. In a related example, the occupancy sensors may be acoustic sensors comprising microphones, where the acoustic sensors monitor sounds in the room to detect when the room is vacant (i.e., when the meeting has ended) but do not transmit acoustic data.

In another example, the privacy mode may be enabled or disabled based on proximity of a user to the device. For example, when a user is within a certain privacy distance of the audio device, the audio device may engage or disengage a privacy mode. The privacy distance may be specified by the user or may be set by the audio device or system controller. For example, the privacy distance may be 3 feet. The audio device may acoustically measure user proximity using a microphone array, or via a single microphone, beacon technology, or any other known technology in measuring distance between a device and a user.

Figure 13:
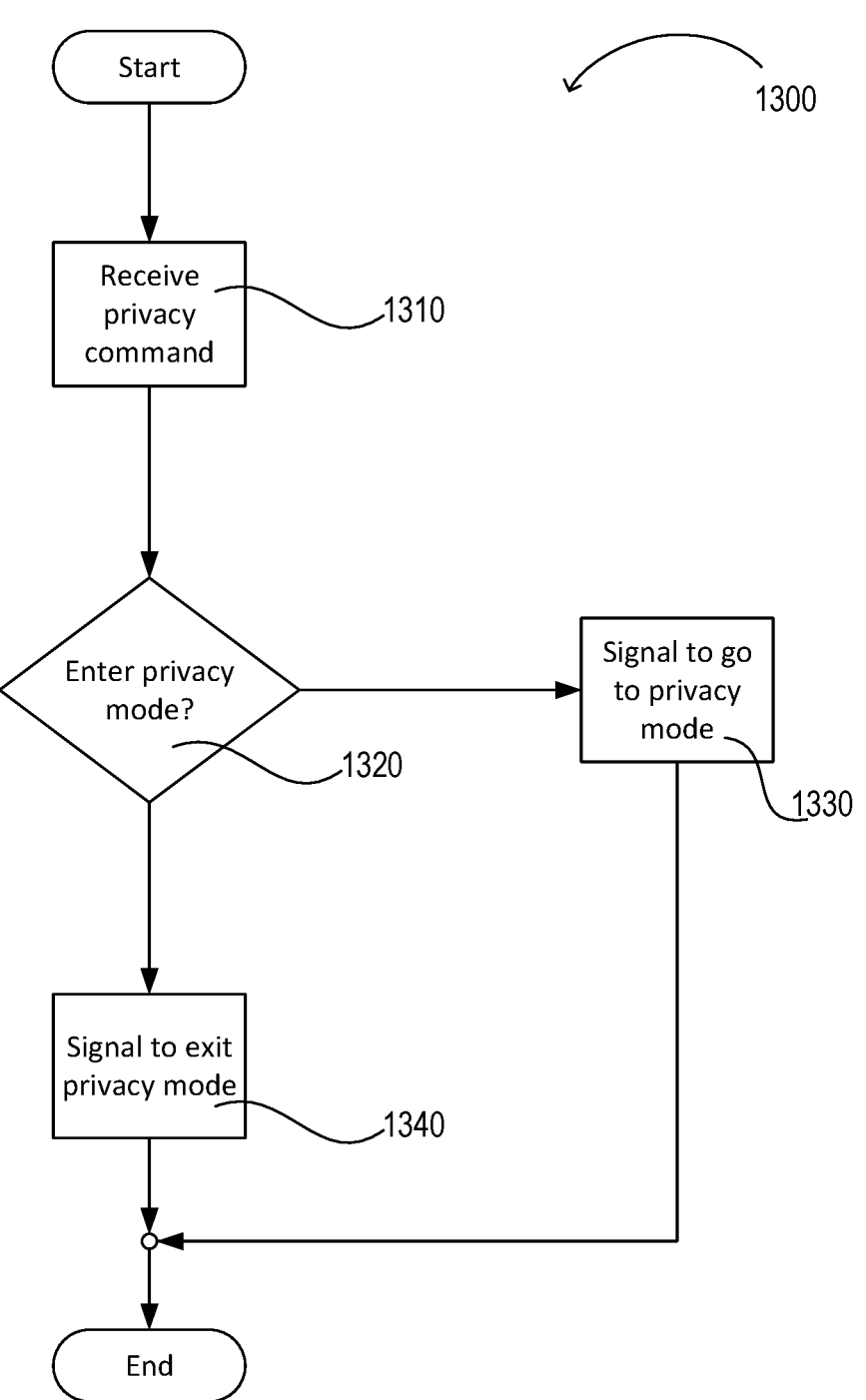
FIG. 13 is an example flowchart of a method for controlling a circuit to enter or exit a privacy mode.

FIG. 13 is an example method 1300 that may be executed by a control circuit of an audio device to enter privacy mode according to any of the embodiments herein. The method may start at step 1310, when the control circuit receives a privacy command. As previously described, the privacy command may be any of: a wireless command (received from a remote button press from a GUI or a detection of occupancy from an occupancy sensor); a detection of occupancy (i.e., from an occupancy sensor integrated with the audio device); a sound (a specific spoken keyword or a noise associated with a specific activity such as a phone ringing); and the like.

At step 1320, the control circuit may determine, based on the privacy command, whether or not to enter privacy mode. For example, if the control circuit has received the privacy command, the control circuit may then send a signal to go into the privacy mode at step 1330. For example, the signal may be providing voltage to a reset line of a remote reset switch, such as line 850 of FIG. 8A, to change the state of the remote reset switch to remove power and/or communication to the microphone, or other portions of the audio device circuitry, for example. In a second example, the signal to go into privacy mode may be a signal 880' as shown in FIG. 8B to instruct a separate second control circuit 855' to begin providing noise/interference signals 865' or 870'. The method may then end.

Alternatively, if the control circuit determines not to enter privacy mode at step 1320, (for example, the privacy command received at 1310 was a signal that the remote reset switch has manually been returned to the non-privacy state, or a wireless command to exit privacy mode has been received, or a vacancy command has been received, etc.), the method may then proceed to step 1340, where the control circuit may provide a signal to exit the privacy mode. For example, the control circuit may cease providing voltage to the reset line of the remote reset switch. In a second example, the control circuit may cease signaling the separate second control circuit to cause the separate second control circuit to stop providing interference signals to obfuscate the acoustic data. The method may then end.

In addition to the embodiments described herein, one skilled in the art will recognize that any combination of these concepts may readily be applied to achieve the same effects, all of which are considered to be within the scope of this disclosure. For example, although not discussed in detail herein, privacy mode may alternatively be achieved through a dedicated privacy link wired throughout the home, i.e., a system of wired devices which may each go into privacy mode when a wired or wireless privacy command is received. Additionally, although most of the disclosure has been specific to audio devices for voice applications, one skilled in the art will further recognize that these concepts are not limited to voice recognition devices, but any audio device which records acoustic data from a space, or other devices such as cameras or video recording devices as well.

What is claimed:

1. An electrical load control apparatus comprising:
   a control circuit selectivity transistionable between a FIRST, non-private, operating state and a SECOND, private, operating state;
   a microphone circuit operatively coupled to the control circuit, the microphone circuit to receive sound and generate acoustic data from the received sound;
   an acoustic noise generation circuit operatively coupled to the control circuit;
   a communication circuit operatively coupled to a control circuit, the communication circuit to transmit the acoustic data to at least one external device;
   wherein the control circuit to:
      receive the acoustic data from the microphone circuit;
      receive an instruction in an input signal to reversibly transition the control circuit between the FIRST, non-private, operating state and the SECOND, private, operating state;
      responsive to an instruction in the received input signal to transition the control circuit to the FIRST, non-private, operating state: cause the communication circuit to transmit the received acoustic data to the at least one external device; and
      responsive to an instruction in the received input signal to transition the control circuit to the SECOND, private, operating state:
      communicate a first output signal to the acoustic noise generation circuit to generate an acoustic noise signal;
         wherein the acoustic signal generated by the acoustic noise generation circuit combines with sound collected by the microphone circuit to produce the obfuscated acoustic data; and cause the communication circuit to transmit the obfuscated acoustic data to the at least one external device.

2. The electrical load control apparatus of claim 1, the control circuit to further:

responsive to the instruction in the received input signal to transition the control circuit to the FIRST, non-private, operating state:

cause the acoustic noise generation circuit to halt the generation of the acoustic noise signal.

3. The electrical load control apparatus of claim 1, the control circuit to further:

responsive to the instruction in the received input signal to transition the control circuit to the SECOND, private, operating state:

communicate, to a system controller, a notification message that includes information indicative of the transition of the control circuit to the SECOND, private, operating state.

4. The electrical load control apparatus of claim 1, further comprising:

at least one manually actuated input device operatively coupled to the control circuit;

wherein to receive the instruction in the input signal to reversibly transition the control circuit between the FIRST, non-private, operating state and the SECOND, private, operating state, the control circuit to;

receive, via an actuation of the at least one manually actuated input device, the instruction to reversibly transition the control circuit between the FIRST, non-private, operating state and the SECOND, private, operating state.

5. The electrical load control apparatus of claim 1, the communication circuit to further:

receive a wireless input signal from a control device;

wherein to receive the instruction in the input signal to reversibly transition the control circuit between the FIRST, non-private, operating state and the SECOND, private, operating state, the control circuit to:

receive, via the communication circuit, the wireless input signal that includes the instruction to reversibly transition the control circuit between the FIRST, non-private, operating state and the SECOND, private, operating state.

6. An electrical load control method, comprising:

receiving, by a control circuit, acoustic data generated by a microphone circuit using sounds detected by the microphone circuit;

receiving, by the control circuit, an input signal to reversibly transition the control circuit between a FIRST, non-private, operating state and a SECOND, private, operating state;

responsive an instruction in the received input signal to transition the control circuit to the FIRST, non-private, operating state:

causing a communicatively coupled communication circuit to transmit the acoustic data received from the microphone circuit to at least one external device; and responsive an instruction in the received input signal to transition the control circuit to the SECOND, private, operating state:

communicating, by the control circuit, a first output signal to an acoustic noise generation circuit to cause a noise generation to generate a noise signal to obfuscate the acoustic data received from the microphone circuit;

wherein the acoustic noise signal generated by the acoustic noise generation circuit combines with sound collected by the microphone circuit to produce the obfuscated acoustic data; and causing, by the control circuit, the communication circuit to transmit the obfuscated acoustic data to the at least one external device.

7. The method of claim 6 further comprising, responsive the instruction in the received input signal to transition the control circuit to the FIRST, non-private, operating state:

ceasing, by the control circuit, transmission of the first output signal to the acoustic noise generation circuit to halt the generation of the acoustic noise signal.

8. The method of claim 6, further comprising, responsive to the instruction in the received input signal to transition the control circuit to the SECOND, private, operating state:

communicating, by the control circuit, a notification message that includes information indicative of the transition of the control circuit to the SECOND, private, operating state to a system controller.

9. The method of claim 6, further comprising, responsive to the instruction in the received input signal to transition the control circuit between the FIRST, non-private, operating state and the SECOND, private, operating state:

receiving, via an actuation of at least one operatively coupled input device, an input signal that includes the instruction to reversibly transition the control circuit between the FIRST, non-private, operating state or the SECOND, private, operating state.

10. The method of claim 6, further comprising, responsive to the instruction in the received input signal to transition the control circuit between the FIRST, non-private, operating state and the SECOND, private, operating state:

receiving, via the communication circuit, a wireless input signal that includes the instruction to reversibly transition the control circuit between the FIRST, non-private, operating state or the SECOND, private, operating state.

11. A non-transitory, machine-readable, storage device that includes instructions that, when executed by a control circuit in an electrical load control apparatus, causes the control circuit to:

receive acoustic data generated by an operatively coupled microphone circuit, the acoustic data based on sounds sensed by the microphone circuit;

receive an instruction in an input signal to reversibly transition the control circuit between a FIRST, non-private, operating state or a SECOND, private, operating state;

responsive to the instruction in the received input signal to transition the control circuit to the FIRST, non-private, operating state:

cause a communicatively coupled communication circuit to transmit the acoustic data received from the microphone circuit to at least one external device; and responsive to the instruction in the received input signal to transition the control circuit to the SECOND, private, operating state:

communicate a first output signal to an operatively coupled acoustic noise generation circuit to cause the noise generation circuit to obfuscate the acoustic data received from the microphone circuit;

wherein the acoustic noise signal generated by the acoustic noise generation circuit combines with sound collected by the microphone circuit to produce the obfuscaed acoustic data; and cause the communication circuit to transmit the obfuscated acoustic data to the at least one external device.

12. The non-transitory, machine-readable, storage device of claim 11 wherein the instructions, when executed by the control circuit, cause the control circuit to:

responsive to the instruction in the received input signal to transition the control circuit to the FIRST, non-private, operating state:

cease transmission of the first output signal to the acoustic noise generation circuit to halt the generation of the acoustic noise signal.

13. The non-transitory, machine-readable, storage device of claim 11 wherein the instructions, when executed by the control circuit, cause the control circuit to:

responsive to the instruction in the received input signal to transition the control circuit to the SECOND, private, operating state:

communicate a notification signal that includes information indicative the transition of the control circuit in the SECOND, private, operating state to a system controller.

14. The non-transitory, machine-readable, storage device of claim 11 wherein the instructions, when executed by the control circuit, cause the control circuit to:

responsive to the instruction in the received input signal to transition the control circuit between the FIRST, non-private, operating state and the SECOND, private, operating state:

receive the input signal to transition the control circuit from at least one manually actuated input device operatively coupled to the control circuit.

15. The non-transitory, machine-readable, storage device of claim 11 wherein the instructions, when executed by the control circuit, cause the control circuit to:

responsive to the instruction in the received input signal to transition the control circuit between the FIRST, non-private, operating state and the SECOND, private, operating state:

receive, via the communication circuit, a wireless input signal generated by a control device.

\* \* \* \* \*